United States Patent
Yui et al.

(10) Patent No.: US 9,857,962 B2
(45) Date of Patent: Jan. 2, 2018

(54) ROBOT OPERATION APPARATUS AND ROBOT OPERATION PROGRAM PRODUCT

(71) Applicant: DENSO WAVE INCORPORATED, Chita-gun, Aichi-pref. (JP)

(72) Inventors: Daisuke Yui, Chita-gun (JP); Motoki Kanada, Toyohashi (JP); Atsuko Sugano, Kariya (JP); Hirota Touma, Obu (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 22 days.

(21) Appl. No.: 15/075,699

(22) Filed: Mar. 21, 2016

(65) Prior Publication Data

US 2016/0271792 A1    Sep. 22, 2016

(30) Foreign Application Priority Data

Mar. 19, 2015 (JP) .................. 2015-56507
Feb. 2, 2016 (JP) .................. 2016-18006

(51) Int. Cl.
| | |
|---|---|
| *B25J 13/06* | (2006.01) |
| *G06F 3/0484* | (2013.01) |
| *G06F 3/0488* | (2013.01) |
| *G06F 3/0486* | (2013.01) |
| *G06F 3/041* | (2006.01) |
| *B25J 9/16* | (2006.01) |
| *G05B 19/409* | (2006.01) |

(52) U.S. Cl.
CPC ........ *G06F 3/04847* (2013.01); *B25J 9/1656* (2013.01); *B25J 13/06* (2013.01); *G05B 19/409* (2013.01); *G06F 3/0416* (2013.01); *G06F 3/0486* (2013.01); *G06F 3/0488* (2013.01); *G05B 2219/36159* (2013.01); *G05B 2219/36162* (2013.01); *G05B 2219/36168* (2013.01)

(58) Field of Classification Search
CPC .. G06F 3/04847; G06F 3/0412; G06F 3/0486; G06F 3/04883; B25J 9/1656; B25J 13/06; G05B 19/409
See application file for complete search history.

(56) References Cited

U.S. PATENT DOCUMENTS

2009/0289591 A1* 11/2009 Kassow ............... B25J 19/0004
                                                318/568.13
2009/0292390 A1* 11/2009 Friedrich ............. G05B 19/409
                                                700/180
(Continued)

FOREIGN PATENT DOCUMENTS

JP    H11-262883 A    9/1999

*Primary Examiner* — Patrick H Mackey
(74) *Attorney, Agent, or Firm* — Oliff PLC

(57) ABSTRACT

A robot operation apparatus comprising: a touch panel that receives input of a touch operation and a movement operation from a user; an operation detector that detects the touch operation and the movement operation to the touch panel; and a behavior command generator that generates a behavior command operating a robot based on a detection result of the operation detector. The behavior command generator performs a behavior speed determination process that determines a behavior speed of the robot based on an operation speed of the movement operation, when the operation detector detects the movement operation to an operation graphic provided on the touch panel.

15 Claims, 27 Drawing Sheets

(56) References Cited

U.S. PATENT DOCUMENTS

| | | | |
|---|---|---|---|
| 2014/0236565 A1* | 8/2014 | Kuwahara | B25J 9/1671 703/22 |
| 2015/0045955 A1* | 2/2015 | Hashiguchi | B25J 9/161 700/264 |
| 2015/0151431 A1* | 6/2015 | Suyama | B25J 9/1671 700/264 |
| 2015/0190925 A1* | 7/2015 | Hoffman | B25J 9/161 700/257 |
| 2015/0273689 A1* | 10/2015 | Ouchi | B25J 9/161 700/257 |
| 2016/0030134 A1* | 2/2016 | Shapter | G06F 3/0488 606/130 |
| 2016/0274784 A1* | 9/2016 | Yui | B25J 9/1658 |
| 2016/0274787 A1* | 9/2016 | Sugano | G06F 3/04883 |

* cited by examiner

ROBOT BEHAVIOR SPEED : Vr

ROBOT BEHAVIOR SPEED : Vr

ROBOT OPERATION APPARATUS AND ROBOT OPERATION PROGRAM PRODUCT

CROSS REFERENCE TO RELATED APPLICATIONS

This application is based on Japanese Patent Application No. 2015-56507 filed on Mar. 19, 2015 and Japanese Patent Application No. 2016-18006 filed on Feb. 2, 2016, the disclosures of which are incorporated herein by reference.

TECHNICAL FIELD

The present disclosure relates to a robot operation apparatus that manually operates a robot and a robot operation program product used in the robot operation apparatus.

BACKGROUND

An industrial robot system performs a manual operation of a robot. The manual operation is performed during teaching work (teaching) for the robot, for example. At the time of the teaching, a user manually operates a robot by using a teaching pendant or the like connected with a controller for controlling the robot. An operation of a robot in manually is referred to as a hand-motion operation or a manual operation.

The teaching pendant often includes a touch panel for receiving touch operation. A type of the teaching pendant including the touch panel performs manual operation of a robot in accordance with so-called drag operation input from a user, that is, tracing the touch panel with a finger or a special device such as a pen.

The inventors of the present application have found the following. The drag operation input to the touch panel is an operation tracing a flat touch panel with the finger of the user or the like. This operation does not produce a physical change such as a press and an inclination of an operation key which may be produced in case of operation of a mechanical operation key. In this condition, the user may be difficult to obtain actual feeling of operation from the teaching pendant while inputting drag operation to the touch panel, and therefore may be difficult to perform intuitive operation, unlike operation using the mechanical operation key.

Patent Literature 1: JP H11-262883 A

SUMMARY

It is an object of the present disclosure is to provide a robot operation apparatus realizing drag operation input to a touch panel for manual operation of a robot so as to improve intuitive operation for a user, and to provide a robot operation program product for this robot operation apparatus.

According to one aspect of the present disclosure, a robot operation apparatus includes: a touch panel that receives input of touch operation and movement operation from a user; an operation detector capable of detecting the touch operation and the movement operation to the touch panel; and a behavior command generator that generates a behavior command for operating a robot based on a detection result by the operation detector. The behavior command generator performs a behavior speed determination process for determining behavior speed of the robot based on operation speed of the movement operation when the operation detector detects the movement operation to an operation graphic formed in the touch panel.

According to the robot operation apparatus of the present disclosure, it may be possible for the user to continue motion of the robot in accordance with continuation of movement of the finger of the user or the like in a manner drawing a circle, for example, and to stop the robot in accordance with a stop of the finger of the user or the like. In this case, it may be possible that the behavior speed of the robot is controlled by the user in accordance with control of the shift speed of the finger of the user or the like. Accordingly, the user easily obtains an impression that movement operation performed by the user, that is, movement of the finger of the user or the like produced by drag operation or flick operation by the user is associated with the motion of the robot. In this condition, it may be possible for the user to directly and intuitively determine the correlation between the movement operation performed by the user and the motion of the robot performed in accordance with the movement operation. As a result, it may be possible to improve operability for the user.

According to the robot operation apparatus of the present disclosure, the user is capable of continuing motion of the robot by continuing movement operation in such a manner as to draw a circle on the touch panel. This configuration allows the user to continue movement operation for operating the robot without limitation to the screen size of the touch panel. In this case, an unintended stop of motion of the robot as a result of discontinuation of drag operation caused by limitation to the screen size of the touch panel is avoidable, for example. Accordingly, operability improves. In addition, according to the configuration allowing continuation of movement operation for operating the robot without limitation to the screen size of the touch panel, it may be possible to reduce the size of the touch panel.

According to another aspect of the present disclosure, a robot operation program product is stored in a non-transitory computer readable storage medium and includes a command that causes a computer incorporated in a robot operation apparatus to determine a behavior speed of a robot based on an operation speed of a movement operation when the operation detector detects the movement operation to an operation graphic formed in the touch panel. The robot operation apparatus includes a touch panel that receives input of touch operation and movement operation from a user, an operation detection being capable of detecting the touch operation and the movement operation to the touch panel, and a behavior command generator that generates a behavior command for operating a robot based on a detection result by the operation detector.

The robot operation program product according to the present disclosure realizes the robot operation apparatus. It may be possible to add a function of the above described robot operation apparatus to a general tablet-type PC, a smartphone or the like by executing the robot operation program product with a general tablet-type PC, a smartphone, or the like having a touch panel display, for example.

According to a robot operation apparatus and a robot operation program product used in the robot operation apparatus, in performing manual operation of a robot by inputting a drag operation to a touch panel, it may be possible to improve operability for use by realizing intuitive operation.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, multiple embodiments of the present disclosure will be described. Incidentally, identical configurations are given identical reference numbers, and the description is omitted.

First Embodiment

Figure 1:
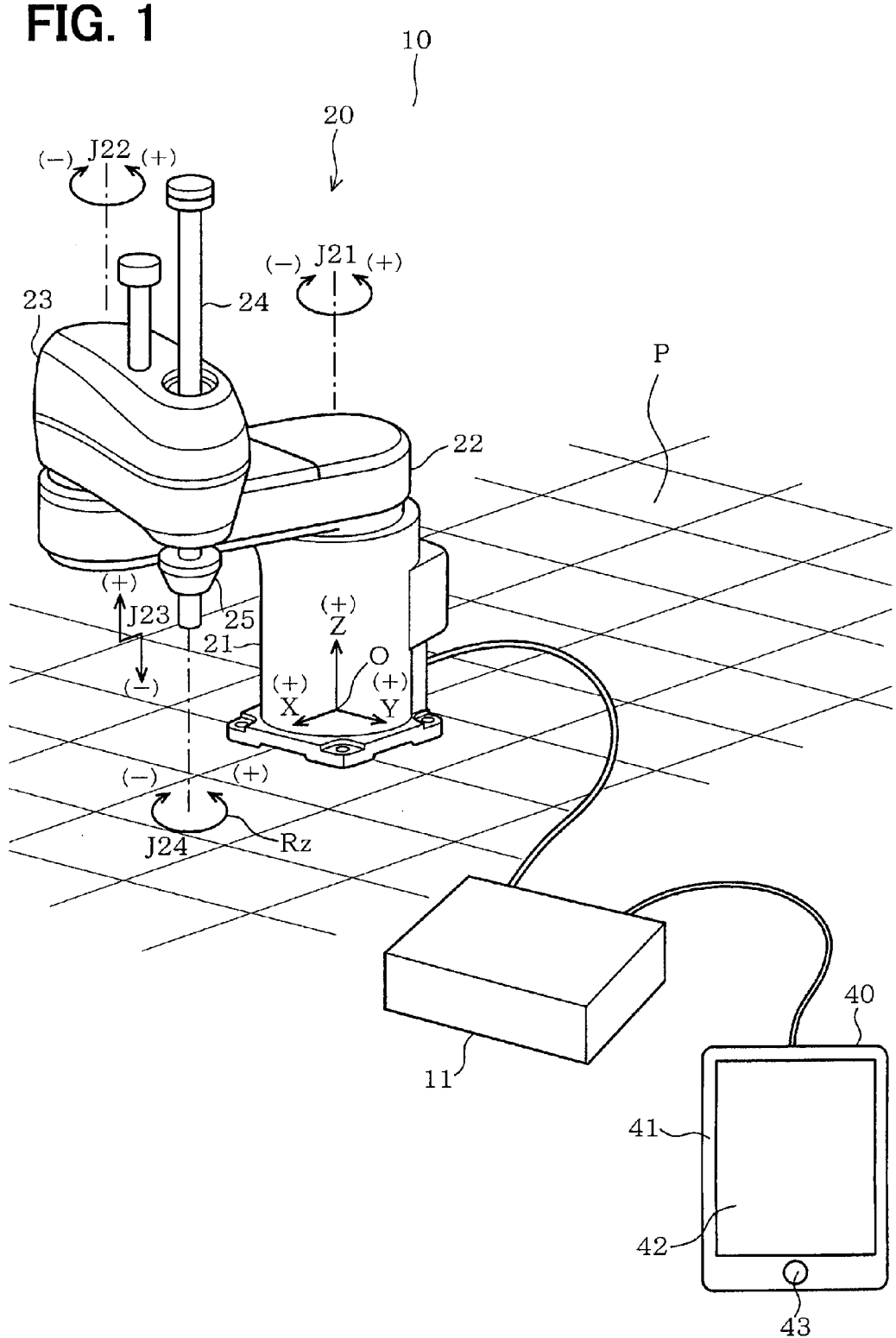
FIG. 1 is a diagram showing a general configuration view illustrating an example of a robot system including a four-axis type horizontally articulated robot according to a first embodiment.
Figure 2:
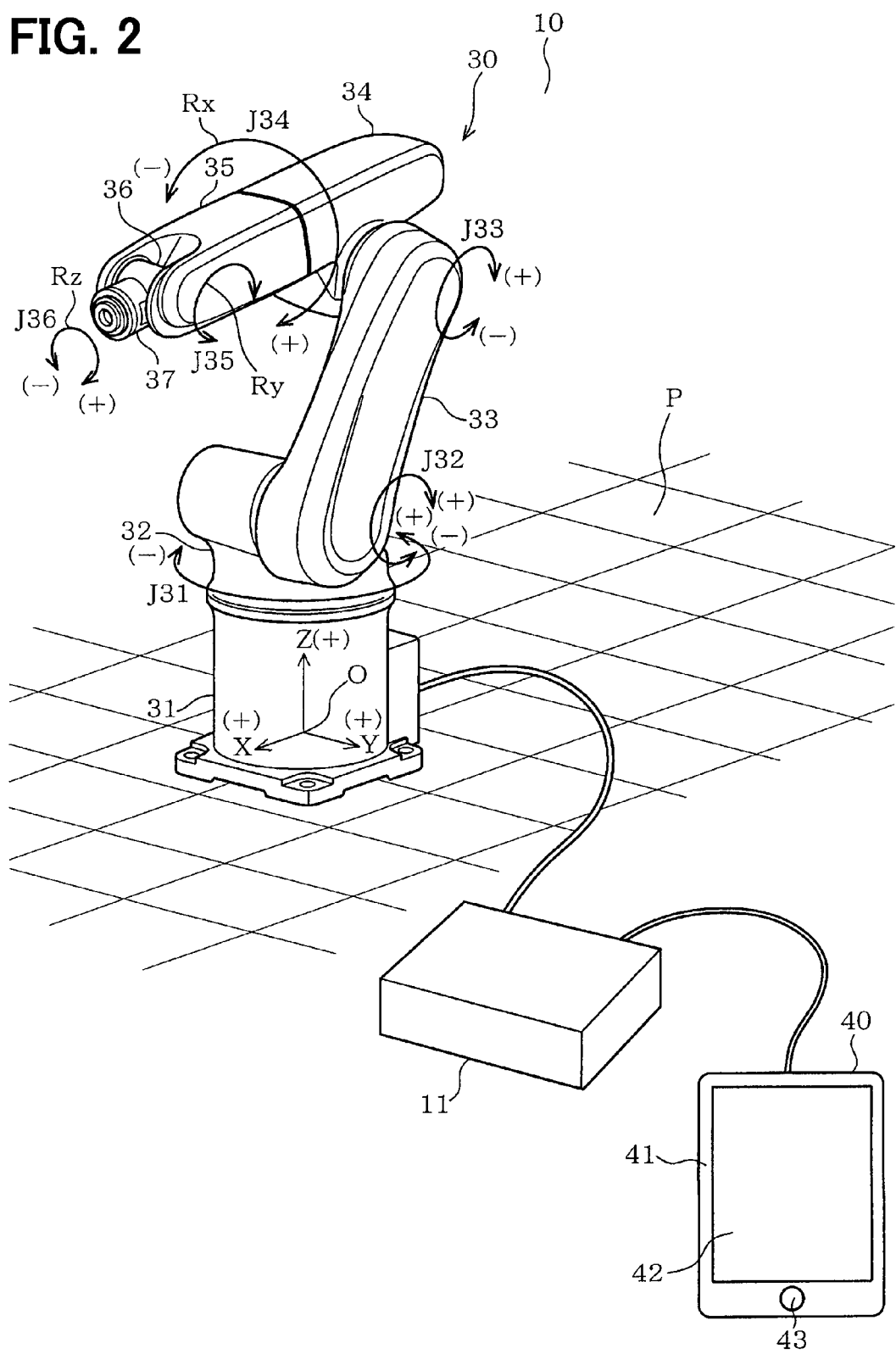
FIG. 2 is a diagram showing a general configuration view illustrating an example of a robot system including a six-axis type vertically articulated robot according to the first embodiment.

A first embodiment according to the present disclosure will hereinafter be described with reference to FIG. 1 to FIG. 18. FIG. 1 and FIG. 2 illustrate a system configuration of a typical industrial robot. A robot system 10 operates a four-axis type horizontally articulated robot 20 (hereinafter referred to as a four-axis robot 20) illustrated in FIG. 1, and a six-axis vertically articulated robot 30 (hereinafter referred to as a six-axis robot 30) illustrated in FIG. 2, for example. The robot to be operated by the robot system 10 is not limited to the four-axis robot 20 and the six-axis robot 30 described herein.

A general configuration of the four-axis robot 20 illustrated in FIG. 1 will be described. The four-axis robot 20 operates on the basis of a specific robot coordinate system. This specific robot coordinate system is a three-dimensional rectangular coordinate system constituted by X axis, Y axis, and Z axis. In the robot coordinate system of this embodiment, it is defined that an origin O is the center of a base 21, an X-Y plane is an upper surface of a work table P, and the Z axis is a coordinate axis orthogonal to the X-Y plane. The upper surface of the work table P is a placing surface on which the four-axis robot 20 is placed. The placing surface corresponds to a motion reference surface. The motion reference surface is not limited to the placing surface, but may be an arbitrary surface.

The four-axis robot 20 includes the base 21, a first arm 22, a second arm 23, a shaft 24, and a flange 25. The base 21 is fixed to the upper surface of the work table P (hereinafter referred to as a placing surface). The first arm 22 is coupled to an upper portion of the base 21 in a manner rotatable in the horizontal direction around a first axis J21 having an axial center in the Z axis (vertical axis) direction. The second arm 23 is coupled to an upper tip portion of the first arm 22 in a manner rotatable around a second axis J22 having an axial center in the Z axis direction. The shaft 24 is movable upward and downward and rotatable relative to a tip portion of the second arm 23. An axis of upward and downward movement of the shaft 24 is a third axis J23, and an axis of rotation of the shaft 24 is a fourth axis J24. The flange 25 is detachably attached to a tip portion, that is, a lower end of the shaft 24.

The base 21, the first arm 22, the second arm 23, the shaft 24, and the flange 25 function as arms of the four-axis robot 20. A not-shown end effector (a fingertip) is attached to the flange 25, which is an arm tip. At the time of investigation of parts by using the four-axis robot 20, for example, the end effector is a camera or the like for imaging a target part. Multiple axes of the four-axis robot 20 (J21 to J24) are driven by motors (not shown) equipped for the respective axes. A position detector (not shown) is provided in the vicinity of each of the motors to detect a rotation angle of the corresponding rotation axis.

A general structure of the six-axis robot 30 illustrated in FIG. 2 will be described. Similarly to the four-axis robot 20, the six-axis robot 30 operates on the basis of a specific robot coordinate system. This specific robot coordinate system is a three-dimensional orthogonal coordinate system constituted by X axis, Y axis, and Z axis. The six-axis robot 30 includes a base 31, a shoulder portion 32, a lower arm 33, a first upper arm 34, a second upper arm 35, a wrist 36, and a flange 37. The base 31 is fixed to the upper surface of the work table P. The shoulder portion 32 is coupled to an upper surface of the base 31 in a manner rotatable in the horizontal direction around a first axis J31 having an axial center in the Z axis (vertical axis) direction. The lower arm 33 extends upward from the shoulder portion 32. The lower arm 33 is coupled to the shoulder portion 32 in a manner rotatable in the vertical direction around a second axis J32 having an axial center in the Y axis direction.

The first upper arm 34 is coupled to a tip portion of the lower arm 33 in a manner rotatable in the vertical direction around a third axis J33 having an axial center in the Y axis direction. The second upper arm 35 is coupled to a tip portion of the first upper arm 34 in a manner torsionally rotatable around a fourth axis J34 having an axial center in the X axis direction. The wrist 36 is coupled to a tip portion of the second upper arm 35 in a manner rotatable in the vertical direction around a fifth axis J25 having an axial center in the Y axis direction. The flange 37 is coupled to the wrist 36 in a manner torsionally rotatable around a sixth axis J36 having an axial center in the X axis direction.

The base 31, the shoulder portion 32, the lower arm 33, the first upper arm 34, the second upper arm 35, the wrist 36, and the flange 37 function as arms of the robot 30. A not-shown tool such as an air chuck is attached to the flange 37 (corresponding to a fingertip) which is the arm tip. Similarly to the four-axis robot 20, multiple axes (J31 to J36) of the six-axis robot 30 are driven by motors equipped for the respective axes. A position detector (not shown) is provided in the vicinity of each of the motors to detect a rotation position of the corresponding rotation axis.

The six-axis robot 30 is capable of independently driving the driving axes J31 to J36 in motion of the axis system. Moreover, the six-axis robot 30 is capable of rotating the fingertip around two axes different from the Z axis in a fingertip system motion, in addition to motions performed by the four-axis robot 20. The two axes are orthogonal to each other and extending horizontally with respect to the placing surface P (that is, X axis and Y axis). In this case, the rotation direction around the X axis is referred to as an Rx direction, and the rotation direction around the Y axis direction is referred to as a Ry direction. Specifically, the six-axis robot 30 is capable of performing, in motion of a fingertip system, motion in the X-Y plane direction by a combination of the first axis J31, the second axis J32, and the third axis J33, motion in the Z direction by a combination of the second axis J32 and the third axis J33, motion in the Rx direction by the fourth axis J34, motion in the Ry direction by the fifth axis J35, and motion in an Rz direction by a sixth axis.

The robot system 10 illustrated in FIG. 1 and FIG. 2 includes a controller 11 and a teaching pendant 40 (corresponding to robot operation apparatus), in addition to the robots 20 and 30. The controller 11 controls each of the robots 20 and 30. The controller 11 is connected with each of the robots 20 and 30 via a connection cable. The teaching pendant 40 is connected with the controller 11 via a connection cable. Data is transmitted and received between the controller 11 and the teaching pendant 40. Accordingly, various types of operation information input as operation from a user is transmitted from the teaching pendant 40 to the controller 11. The controller 11 transmits various types of control signals, display signals and the like, and driving power to the teaching pendant 40. The teaching pendant 40 and the controller 11 may be connected with each other via wireless communication.

The controller 11 allows manual motion of the robots 20 and 30 when receiving a signal of a manual behavior command from the teaching pendant 40. Moreover, the controller 11 allows automatic motion of the robots 20 and 30 by starting an automatic program stored beforehand when receiving a signal of an automatic behavior command from the teaching pendant 40.

Figure 3:
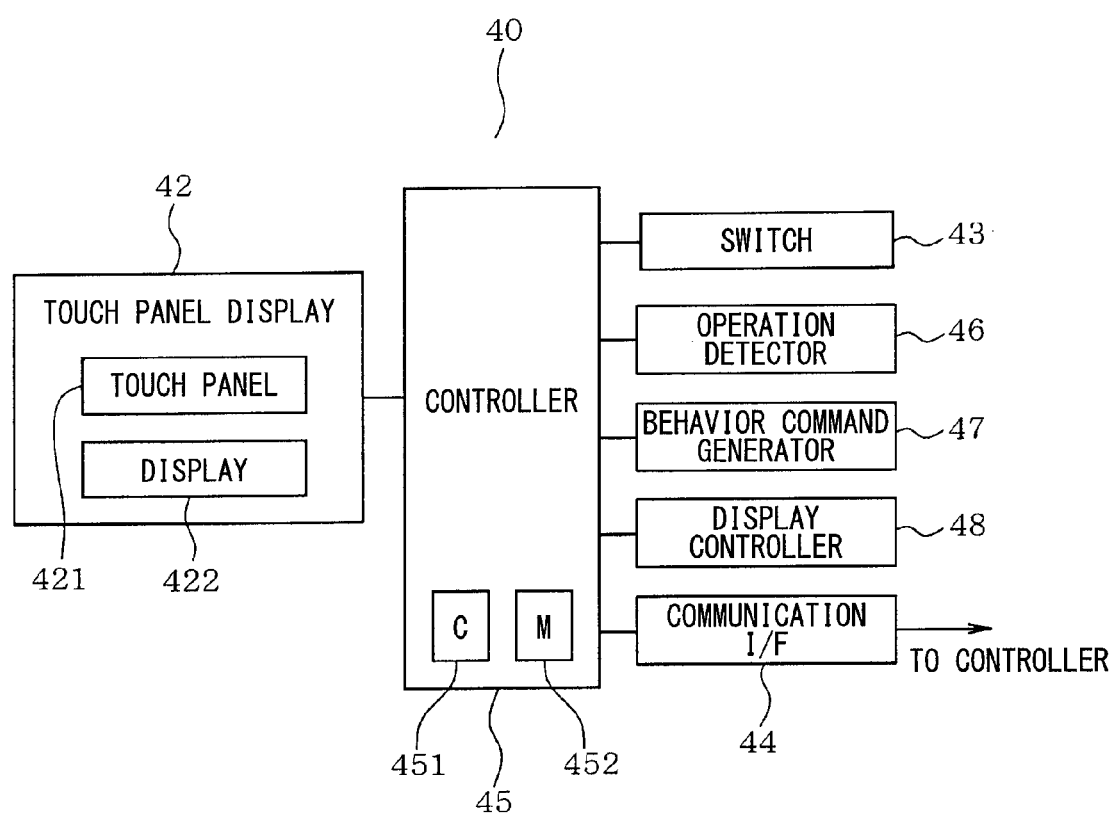
FIG. 3 is a block diagram illustrating an example of an electric configuration of a teaching pendant according to the first embodiment.

The teaching pendant 40 has a size operable by the user while carried or held by a hand of the user, for example. The teaching pendant 40 includes a case 41, a touch panel display 42, and a switch 43, for example. The case 41 has a thin and substantially rectangular box shape, for example, and constitutes an outer casing of the teaching pendant 40. The touch panel display 42 occupies a majority of the front surface of the case 41. As illustrated in FIG. 3, the touch panel display 42 includes a touch panel 421 and a display 422 overlapping with each other.

The touch panel display 42 is capable of receiving input of touch operation, drag operation, and flick operation from the user through the touch panel 421, and displaying images such as characters, numerals, symbols, and drawings on the display 422. The drag operation and the flick operation constitute one mode of movement operation for each, and are distinguished from each other based on a period from contact between a finger 90 of the user or the like and the touch panel display 42 until separation of the finger 90 or the like from the touch panel display 42, that is, a time required for operation, or based on the amount of a shift of the finger 90 or the like. In this case, an operation is the drag operation when the time required for the operation is longer than a predetermined time. An operation is flick operation when the time is shorter than the predetermined time, for example. Drag operation will be described as an example of the movement operation. However, this description is applicable to flick operation as well. The switch 43 is a physical switch provided on the periphery of the touch panel display 42. The switch 43 may be a button displayed on the touch panel display 42 in place of the physical switch. The user executes various types of input operation by operating the touch panel display 42 and the switch 43.

The user operates the teaching pendant 40 to execute various types of functions such as driving and setting of the robots 20 and 30. For example, the user calls a control program stored in the teaching pendant 40 beforehand to start the robots 20 and 30 and set various types of parameters. Moreover, the user performs manual operation of the robots 20 and 30 to execute various types of teaching work for the robots 20 and 30. The touch panel display 42 displays a menu screen, a setting input screen, a state display screen and the like as necessary.

An electric structure of the teaching pendant 40 will be described with reference to FIG. 3.

The teaching pendant 40 includes a communication interface (I/F) 44, a controller 45, an operation detector 46, a behavior command generator 47, and a display controller 48, in addition to the touch panel display 42 and the switch 43. The communication interface 44 connects the controller 45 of the teaching pendant 40 and the controller 11, so that both the controller 45 and the controller 11 can communicate with each other.

For example, the controller 45 is mainly constituted by a microcomputer including a CPU 451, and a storage area 452 such as a ROM, a RAM, and a rewritable flash memory, and controls the overall operation of the teaching pendant 40. The storage area 452 stores the robot operation program. The CPU 451 of the controller 45 executes the robot operation programs to virtually realize the operation detector 46, the behavior command generator 47, the display controller 48 and others by software. The operation detector 46, the behavior command generator 47, and the display controller 48 may be realized by hardware, that is, an integrated circuit formed integrally with the controller 45, for example. The storage area 452 is an example of a non-transitory computer-readable storage medium.

The operation detector 46 detects touch operation and drag operation input to the touch panel 421. The operation detector 46 detects, as detection of touch operation, whether or not the finger of the user or the like contacts the touch panel display 42, and detects the position of the finger or the like in contact with the touch panel display 42 (touch position). Moreover, the operation detector 46 detects, as detection of drag operation, a present position, a shift direction, a shift speed, and a shift amount of the finger or the like associated with the drag operation.

The behavior command generator 47 generates a behavior command for allowing motion of the robots 20 and 30 based on a detection result by the operation detector 46. The behavior command generated by the behavior command generator 47 is given to the controller 11 via the communication interface 44. The display controller 48 controls display contents displayed on the display 422 based on operation input to the switch 43, a detection result received from the operation detector 46, and others. The user realizes manual operation of the robots 20 and 30 by inputting touch operation and drag operation to the teaching pendant 40 thus configured.

Control contents executed by the controller 45 will be described with reference to FIG. 4 to FIG. 15. In the following description, a behavior mode of the robots 20 and 30 refers to a behavior mode of the robots 20 and 30 achieved by the driving axes or a combination of the driving axes of the robots 20 and 30. In this case, the behavior mode of the robots 20 and 30 does not include a shift direction in the positive (+) direction or the negative (−) direction in each of the motion systems such as the fingertip system and axis system described above.

Figure 4:
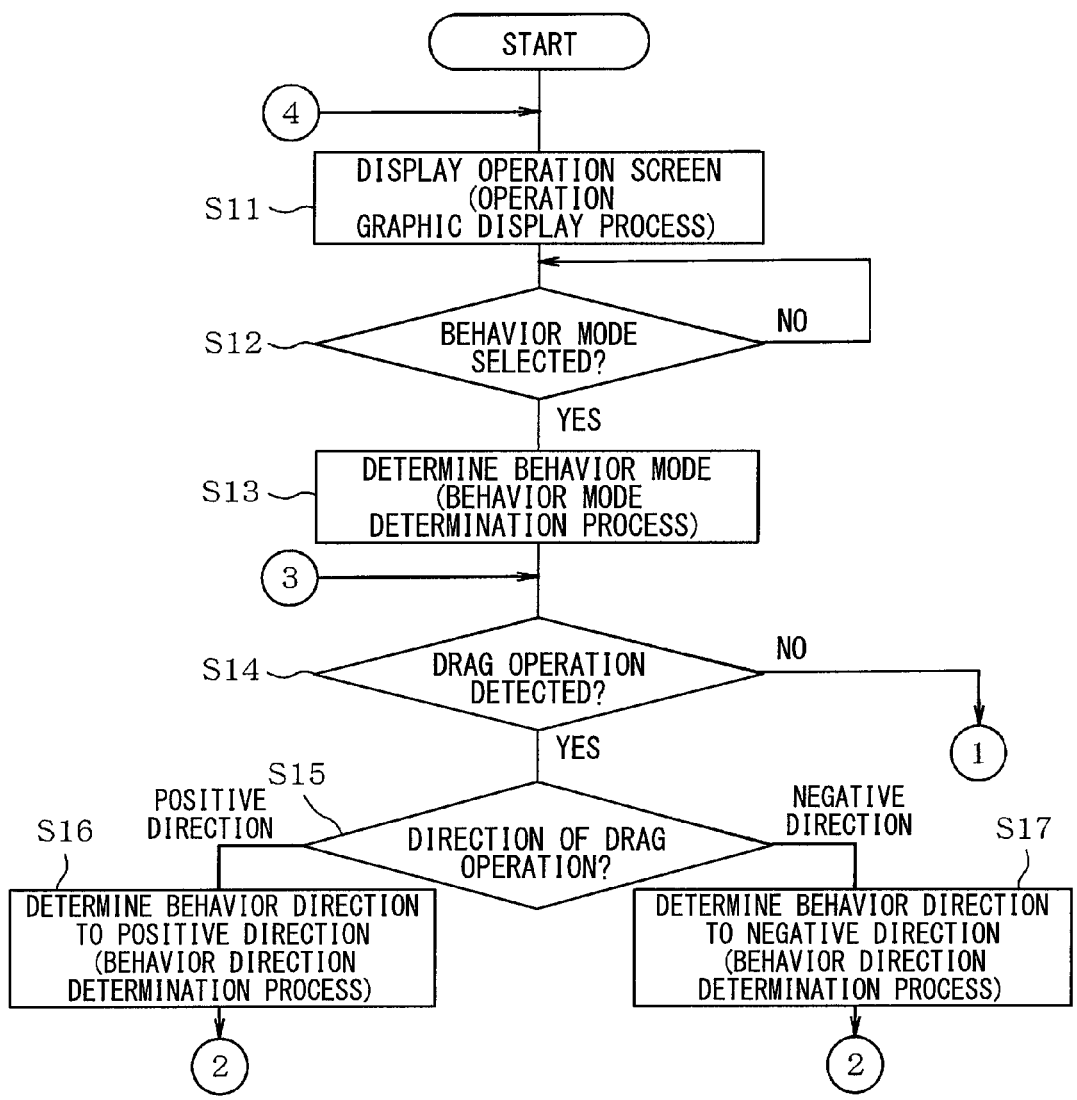
FIG. 4 is a flowchart illustrating example contents of processes performed by a controller according to the first embodiment.
Figure 5:
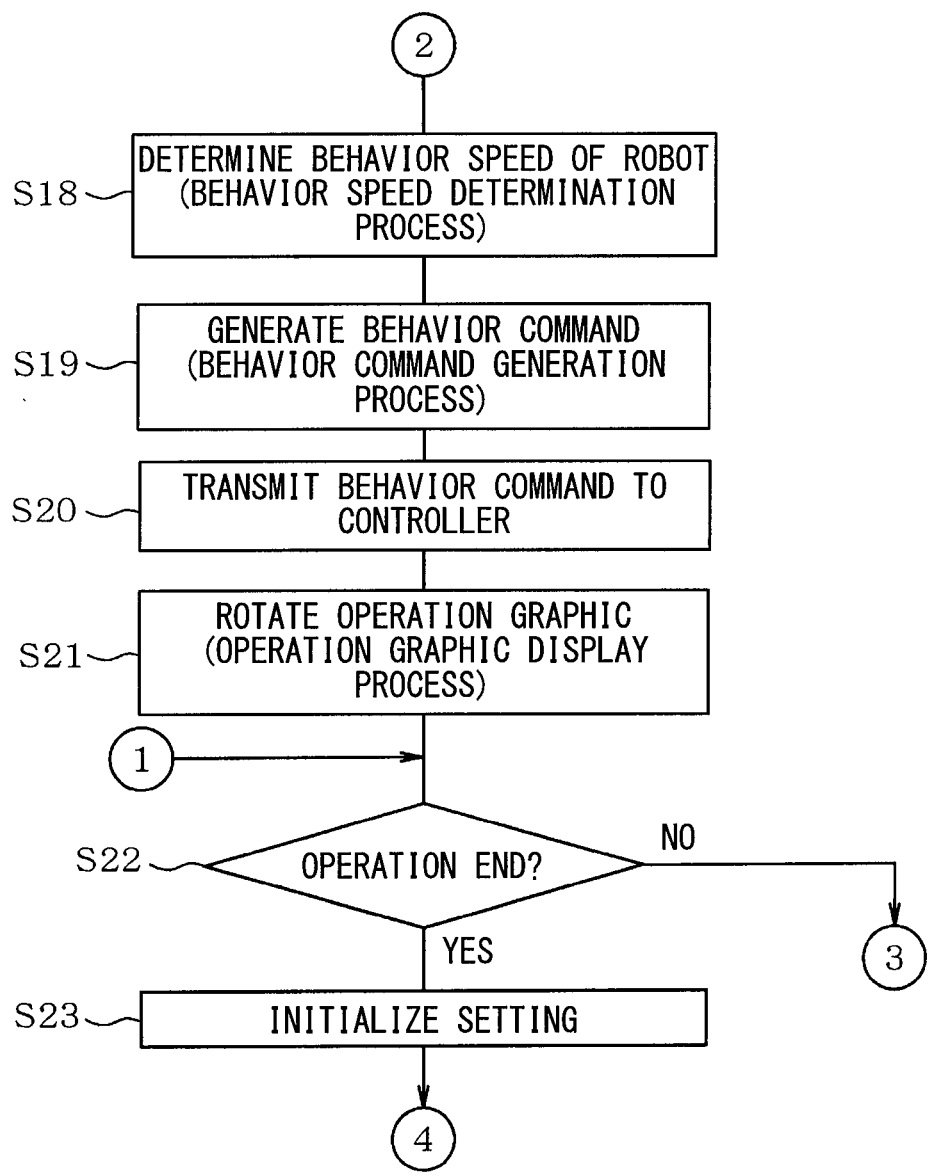
FIG. 5 is a flowchart illustrating example contents of processes performed by the controller according to the first embodiment.

The controller 45 of the teaching pendant 40 executes control contents illustrated in FIG. 4 and FIG. 5 when manual operation of the robots 20 and 30 starts. Specifically, when a process associated with the manual operation starts, the controller 45 displays an operation graphic on the touch panel display 42 in S11 in FIG. 4. FIG. 6 to FIG. 9 illustrate examples of the operation graphic displayed on the touch panel display 42.

Figure 6:
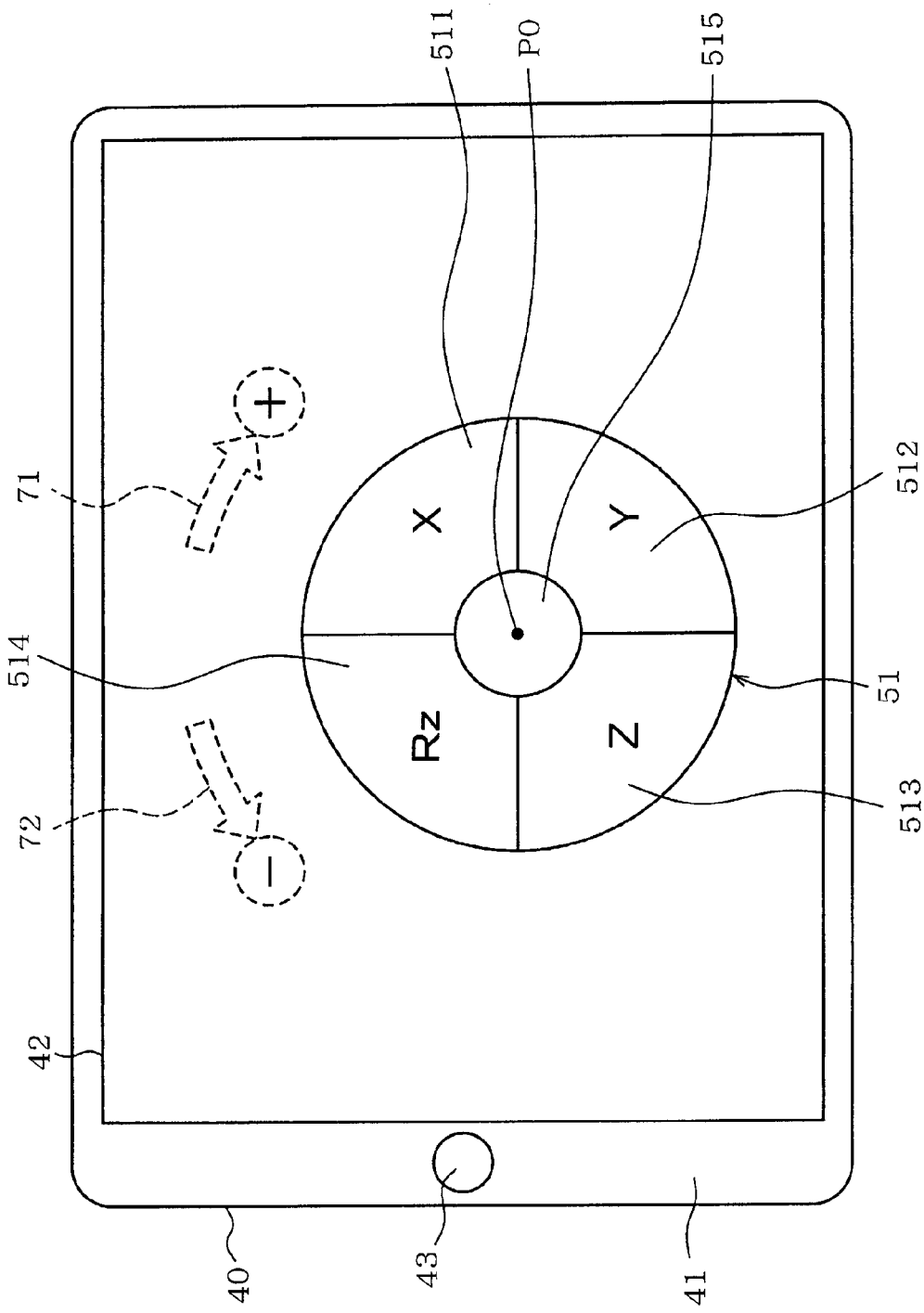
FIG. 6 is a diagram showing an example of an operation graphic displayed on a touch panel display when manual operation of a fingertip system of the four-axis robot is performed according to the first embodiment.
Figure 7:
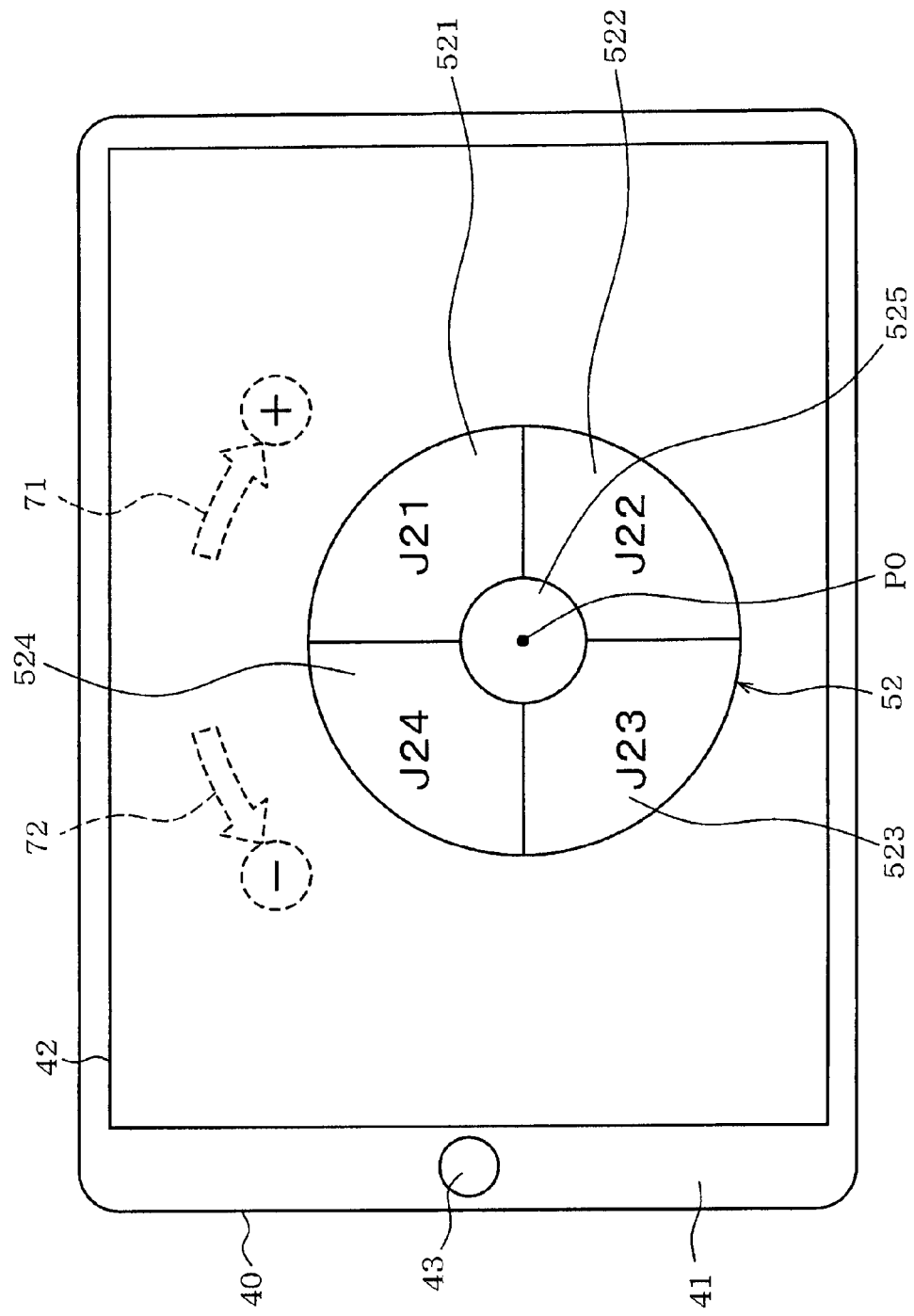
FIG. 7 is a diagram showing an example of an operation graphic displayed on the touch panel display when manual operation of an axis system of the four-axis robot is performed according to the first embodiment.
Figure 8:
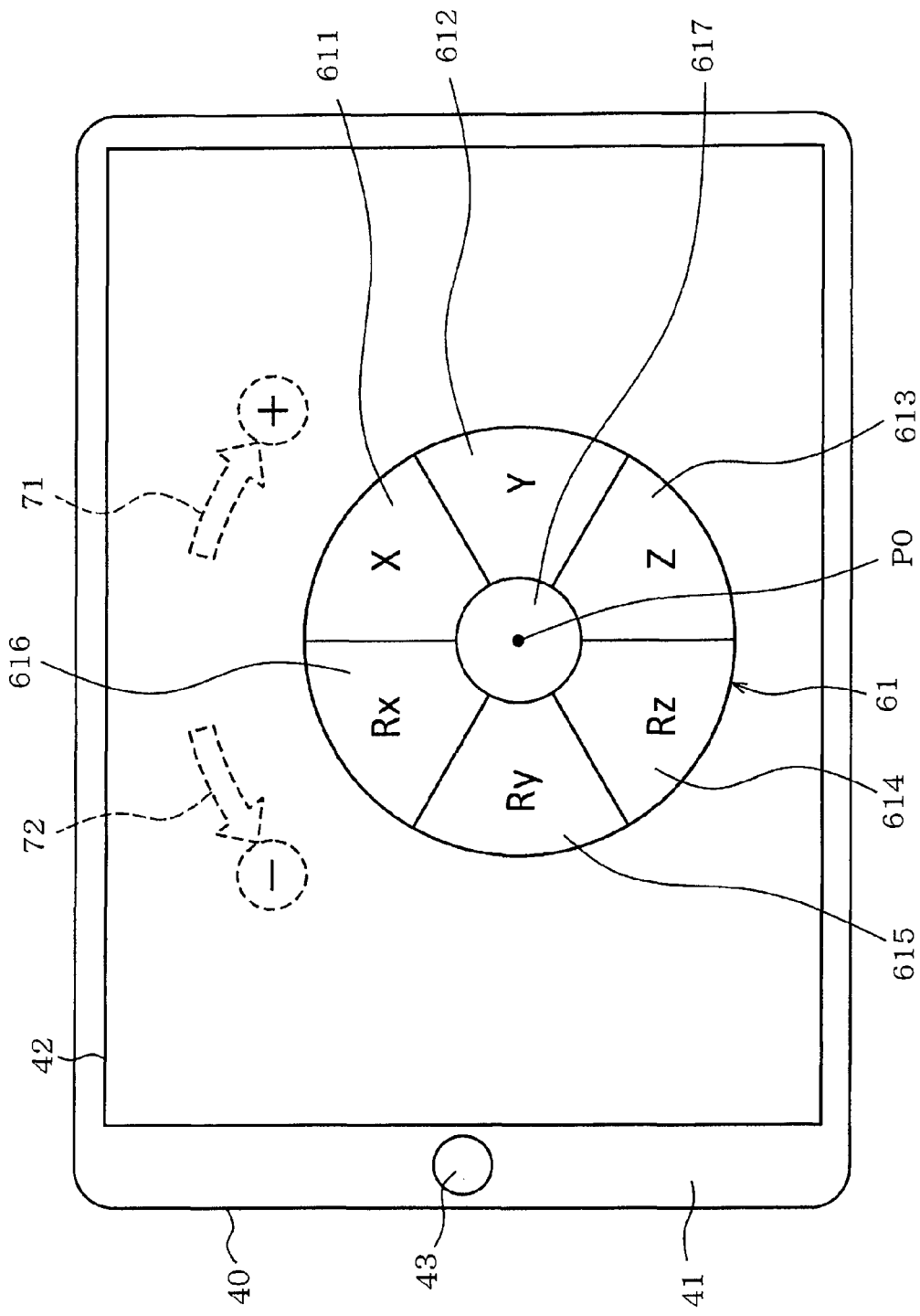
FIG. 8 is a diagram showing an example of an operation graphic displayed on the touch panel display when manual operation of a fingertip system of the six-axis robot is performed according to the first embodiment.
Figure 9:
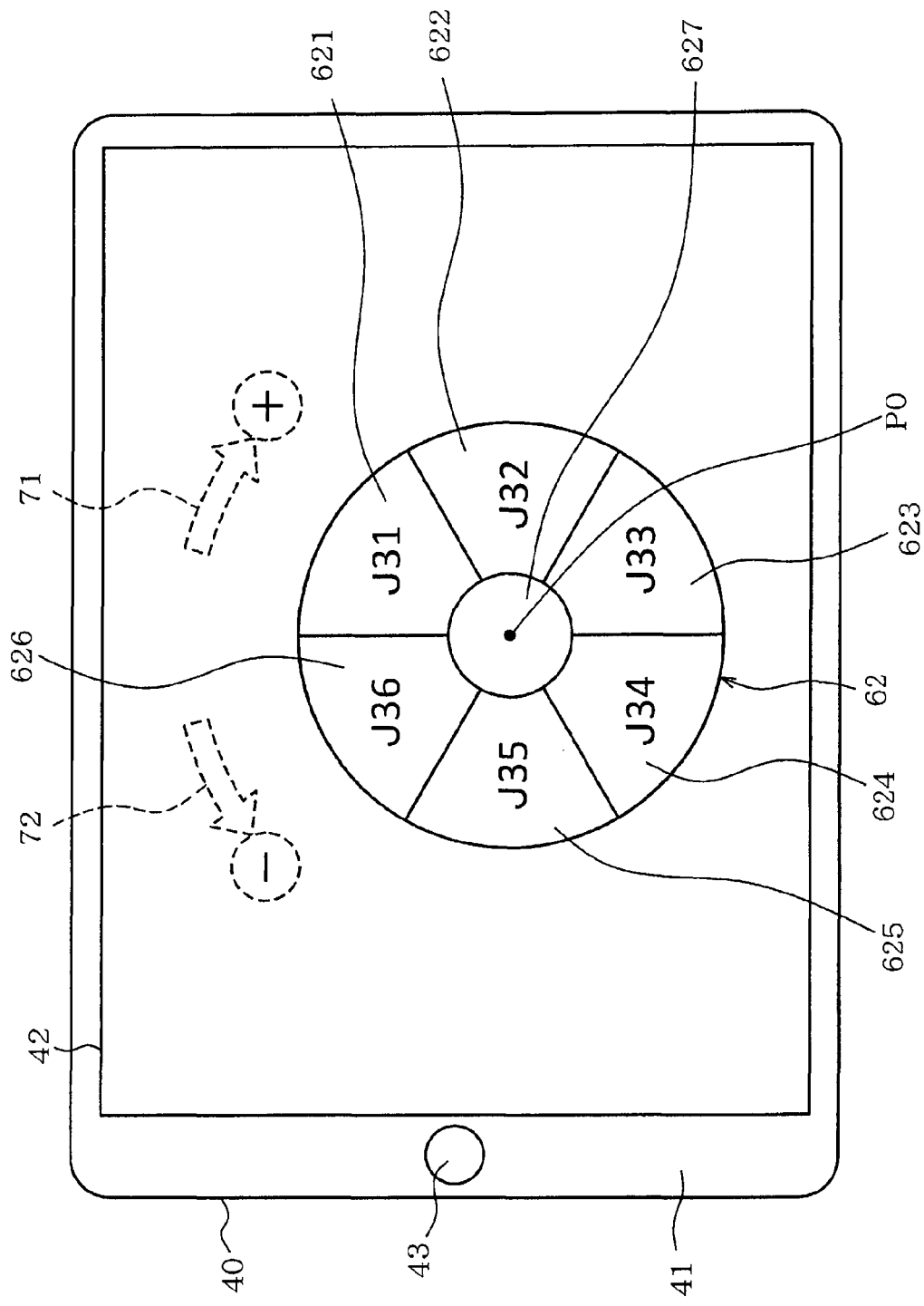
FIG. 9 is a diagram showing an example of an operation graphic displayed on the touch panel display when manual operation of an axis system of the six-axis robot is performed according to the first embodiment.

For example, an operation graphic 51 illustrated in FIG. 6 is used for receiving operation of the fingertip system of the four-axis robot 20, and an operation graphic 52 illustrated in FIG. 7 is used for receiving operation of the axis system of the four-axis robot 20. An operation graphic 61 illustrated in FIG. 8 is used for receiving operation of the fingertip system of the six-axis robot 30, and an operation graphic 62 illustrated in FIG. 9 is used for receiving operation of the axis system of the six-axis robot 30. In the following description, the operation graphic 51 illustrated in FIG. 6 is referred to as the four-axis fingertip system graphic 51, and the operation graphic 52 illustrated in FIG. 7 is referred to as the four-axis axis system operation graphic 52. The operation graphic 61 illustrated in FIG. 8 is referred to as the six-axis fingertip system graphic 61, and the operation graphic 62 illustrated in FIG. 9 is referred to as the six-axis axis system operation graphic 62.

The operation graphics 51 and 52 for the four-axis robot 20 illustrated in FIG. 6 and FIG. 7 will be described. Each of the operation graphics 51 and 52 for the four-axis robot 20 has a circular external shape. The inside of each of the operation graphics 51 and 52 for the four-axis robot 20 is divided into equal parts by the number of behavior modes of the motion system. The inside of each circle of the operation graphics 51 and 52 for the four-axis robot 20 is divided into four parts in accordance with the number of the driving modes of each of the motion systems of the four-axis robot 20. The four equal parts in each inside of the operation graphics 51 and 52 are defined as selection areas 511 to 514 of the fingertip system, and selection areas 521 to 524 of the axis system, respectively.

In the four-axis fingertip operation graphic 51 illustrated in FIG. 6, the first selection area 511 is allocated to a behavior mode in the X direction, the second selection area 512 is allocated to the behavior mode in the Y direction, the third selection area 513 is allocated to the behavior mode in the Z direction, and the fourth selection area 514 is allocated to the behavior mode in the Rz direction. In the four-axis axis operation graphic 52 illustrated in FIG. 7, the first selection area 521 is allocated to a behavior mode of the first axis J21, the second selection area 522 is allocated to the behavior mode of the second axis J22, the third selection area 523 is allocated to the behavior mode of the third axis J23, and the fourth selection area 524 is allocated to the behavior mode of the fourth axis J24.

Accordingly, the user touches any one of the selection areas 511 to 514 and 521 to 524 in the respective operation graphics 51 and 52 to operate the four-axis robot 20 in the behavior mode allocated to the touched area. The four-axis fingertip system operation graphic 51 and the four-axis axis system operation graphic 52 may be switched for display on the screen as illustrated in FIG. 6 and FIG. 7, or may be displayed at a time on the same screen.

The operation graphics 61 and 62 for the six-axis robot 30 illustrated in FIG. 8 and FIG. 9 will be described. Each of the operation graphics 61 and 62 for the six-axis robot 30 has a circular external shape. The inside of each of the operation graphics 61 and 62 for the six-axis robot 30 is divided into equal parts by the number of behavior modes of the motion system. The inside of each circle of the operation graphics 61 and 62 for the six-axis robot 30 is divided into six parts in accordance with the number of the driving modes of each of the motion systems of the six-axis robot 30. The six equal parts in each inside of the operation graphics 61 and 62 are defined as selection areas 611 to 616 of the fingertip system, and selection areas 621 to 626 of the axis system, respectively.

In the six-axis fingertip operation graphic 61 illustrated in FIG. 8, the first selection area 611 is allocated to a behavior mode in the X direction, the second selection area 612 is allocated to the behavior mode in the Y direction, the third selection area 613 is allocated to the behavior mode in the Z direction, the fourth selection area 614 is allocated to the behavior mode in the Rx direction, the fifth selection area 615 is allocated to the behavior mode in the Ry direction, and the sixth selection area 616 is allocated to the behavior mode in the Rz direction. In the six-axis axis operation graphic 62 illustrated in FIG. 9, the first selection area 621 is allocated to a behavior mode of the first axis J31, the second selection area 622 is allocated to the behavior mode of the second axis J32, the third selection area 623 is allocated to the behavior mode of the third axis J33, the fourth selection area 624 is allocated to the behavior mode of the fourth axis J34, the fifth selection area 625 is allocated to the behavior mode of the fifth axis J35, and the sixth selection area 626 is allocated to the behavior mode of the sixth axis J36.

Accordingly, the user touches any one of the selection areas 611 to 616 and 621 to 626 in the respective operation graphics 61 and 62 to operate the six-axis robot 30 in the behavior mode allocated to the touched area. The six-axis fingertip system operation graphic 61 and the six-axis axis system operation graphic 62 may be switched for display on the screen as illustrated in FIG. 8 and FIG. 9, or may be displayed at a time on the same screen.

As illustrated in FIG. 6 to FIG. 9, the operation graphics 51, 52, 61, and 62 include invalid areas 515, 525, 617, and 627, respectively. The invalid areas 515, 525, 617, and 627 are disposed in the vicinity of centers P0 of the operation graphics 51, 52, 61, and 62, respectively. In this case, the invalid areas 515, 525, 617, and 627 have concentric shapes smaller than the circles forming the external shapes of the operation graphics 51, 52, 61, and 62, respectively, and provided inside the operation graphics 51, 52, 61, and 62, respectively. The controller 45 determines operation input to the invalid areas 515, 525, 617, and 627 as invalid in both touch operation and drag operation detected by the operation detector 46. In this embodiment, the controller 45 also determines operation input to the outside of the operation graphics 51, 52, 61, and 62 as invalid both in touch operation and drag operation detected by the operation detector 46. In this case, the areas outside the operation graphics 51, 52, 61, and 62 are also referred to as invalid areas.

In S11, the controller 45 displays direction graphics 71 and 72 on the touch panel display 42 as illustrated in FIG. 6 to FIG. 9. Each of the direction graphics 71 and 72 indicates an operation direction of drag operation with respect to the rotation center P0. In this embodiment, each of the centers P0 of the operation graphics 51, 52, 61, and 62 is set to the rotation center P0 of drag operation. Rightward rotation, that is, clockwise rotation around the rotation center P0 is defined as a positive direction of drag operation, while leftward rotation, that is, anticlockwise rotation around the rotation center P0 is defined as a negative direction of drag operation. In this case, the positive direction graphic 71 indicates the positive direction of drag operation, while the negative direction graphic 72 indicates the negative direction of drag operation.

In this embodiment, the controller 45 controls the display controller 48 to control display of the direction graphics 71 and 72 in the following manner. When drag operation is not input to the touch panel display 42, the controller 45 displays the direction graphics 71 and 72 in a light color as illustrated in broken lines in FIG. 6 to FIG. 9. Thus, the user is capable of recognizing directions allowed for drag operation while viewing the direction graphics 71 and 72 displayed in a light color. Accordingly, operability improves.

Figure 11:
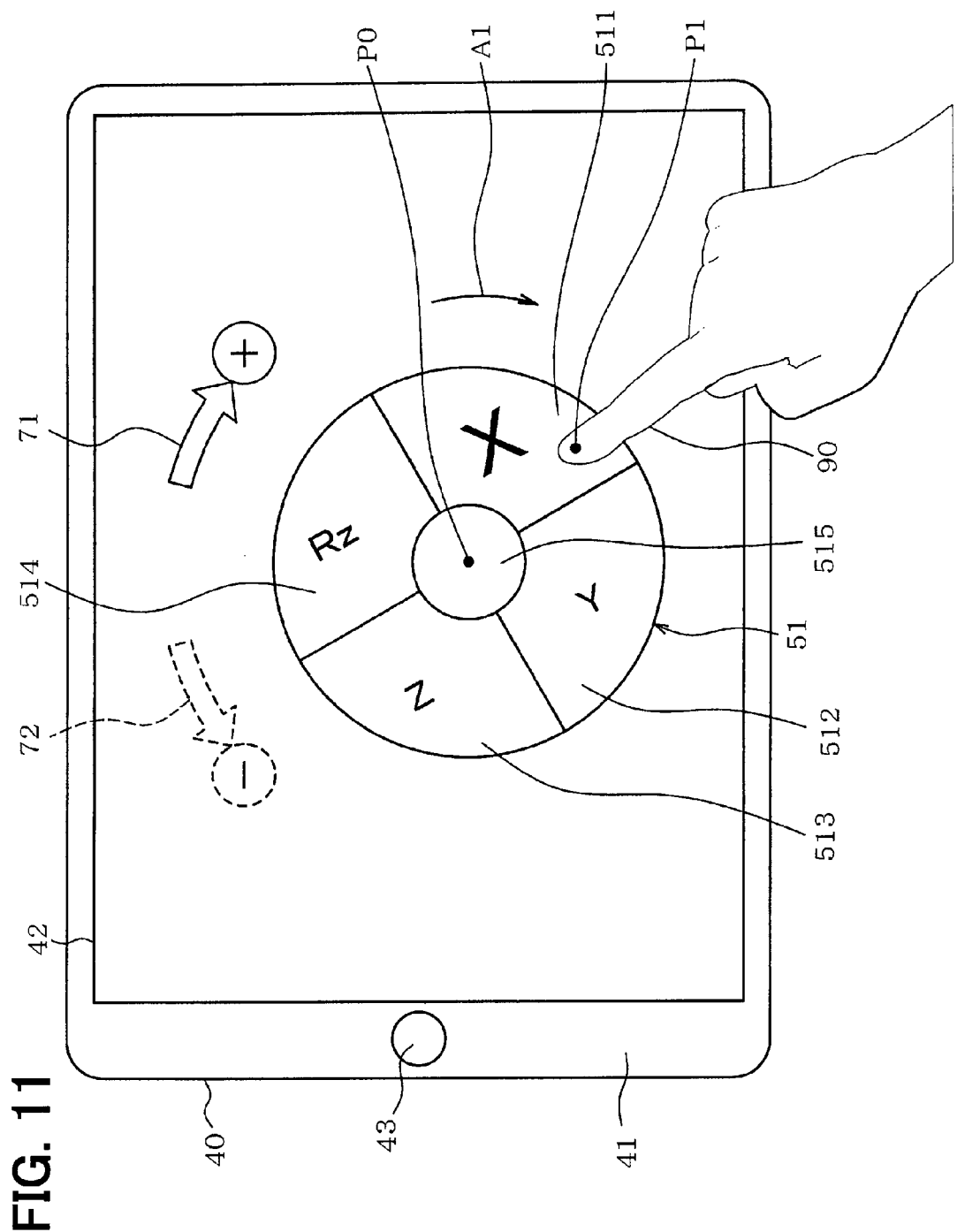
FIG. 11 is a diagram showing an example of the operation graphic displayed on the touch panel display when drag operation is input to the operation graphic in a positive direction according to the first embodiment.
Figure 12:
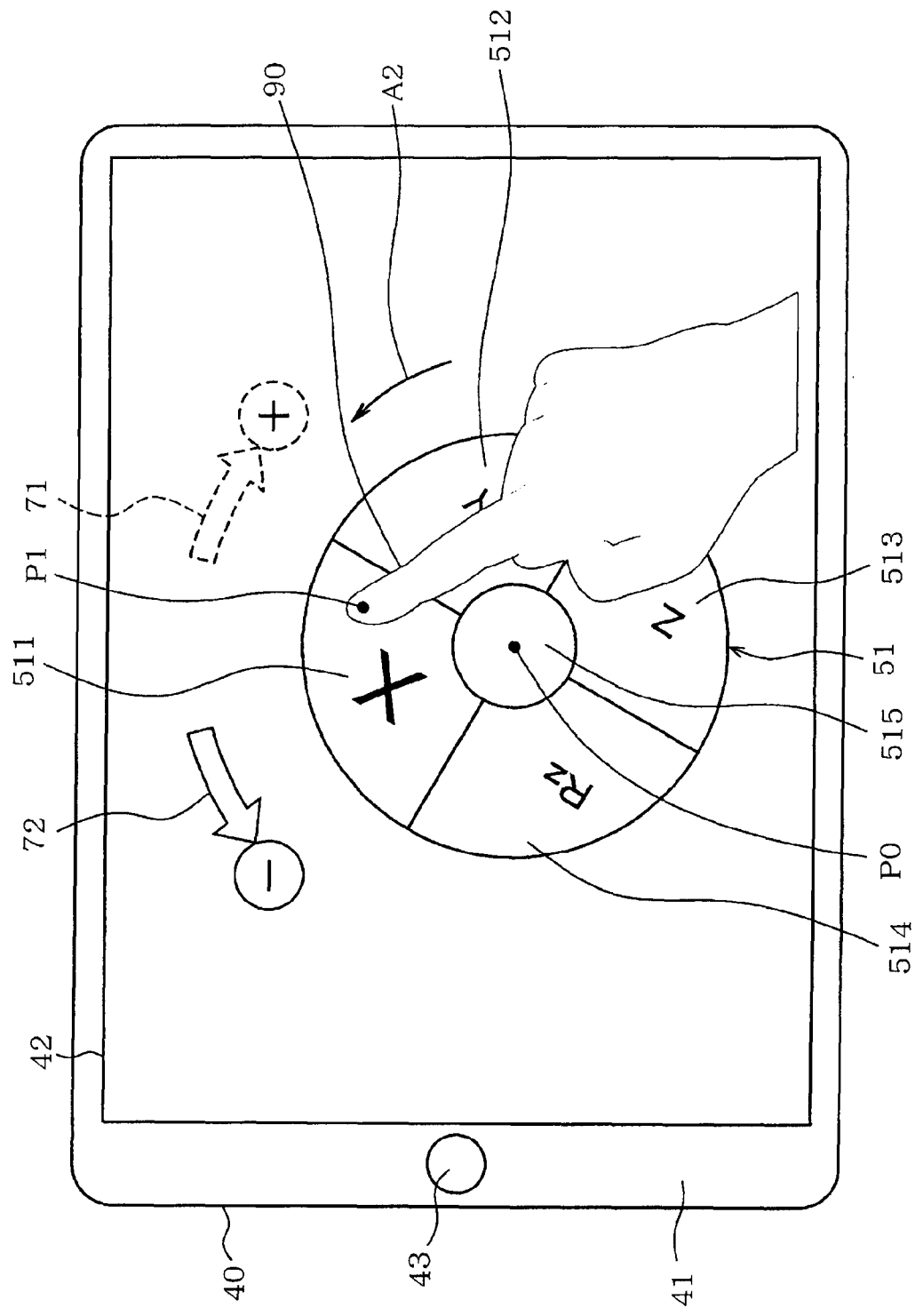
FIG. 12 is a diagram showing an example of the operation graphic displayed on the touch panel display when drag operation is input to the operation graphic in a negative direction according to the first embodiment.

When it is determined that drag operation in the rotation circumferential direction of the operation graphic 51, 52, 61, or 62 has been input, that is, drag operation in the rotation circumferential direction with respect to the rotation center P0 has been input, the controller 45 displays the direction graphic 71 or 72 corresponding to the direction of the input drag operation in a more noticeable manner than the direction graphic 71 or 72 corresponding to the other direction as illustrated in FIG. 11 and FIG. 12. For example, when it is determined that drag operation in the positive direction with respect to the rotation center P0 has been input, the controller 45 displays the positive direction graphic 71 in a darker color than the color of the negative graphic 72 as illustrated in FIG. 11. When it is determined that drag operation in the negative direction with respect to the rotation center P0 has been input, the controller 45 displays the negative direction graphic 72 in a darker color than the color of the positive direction graphic 71 as illustrated in FIG. 12. In this structure, the user is capable of checking whether or not drag operation has been recognized by the teaching pendant 40 as operation in a manner intended by the user while viewing the direction graphic 71 or 72 displayed in a dark color. Accordingly, operability improves.

In S12 in FIG. 4, the controller 45 determines whether or not touch operation has been input to any one of the selection areas 511 to 514, and 521 to 524, or any one of the selection areas 611 to 616 and 621 to 626 based on a detection result received from the operation detector 46. When it is determined that no touch operation has been input to any one of these selection areas (NO in S12), the controller 45 waits in the states illustrated in FIGS. 6 to 9. When it is determined that touch operation has been input to any one of the selection areas (YES in S12), the controller 45 shifts to S13.

Figure 10:
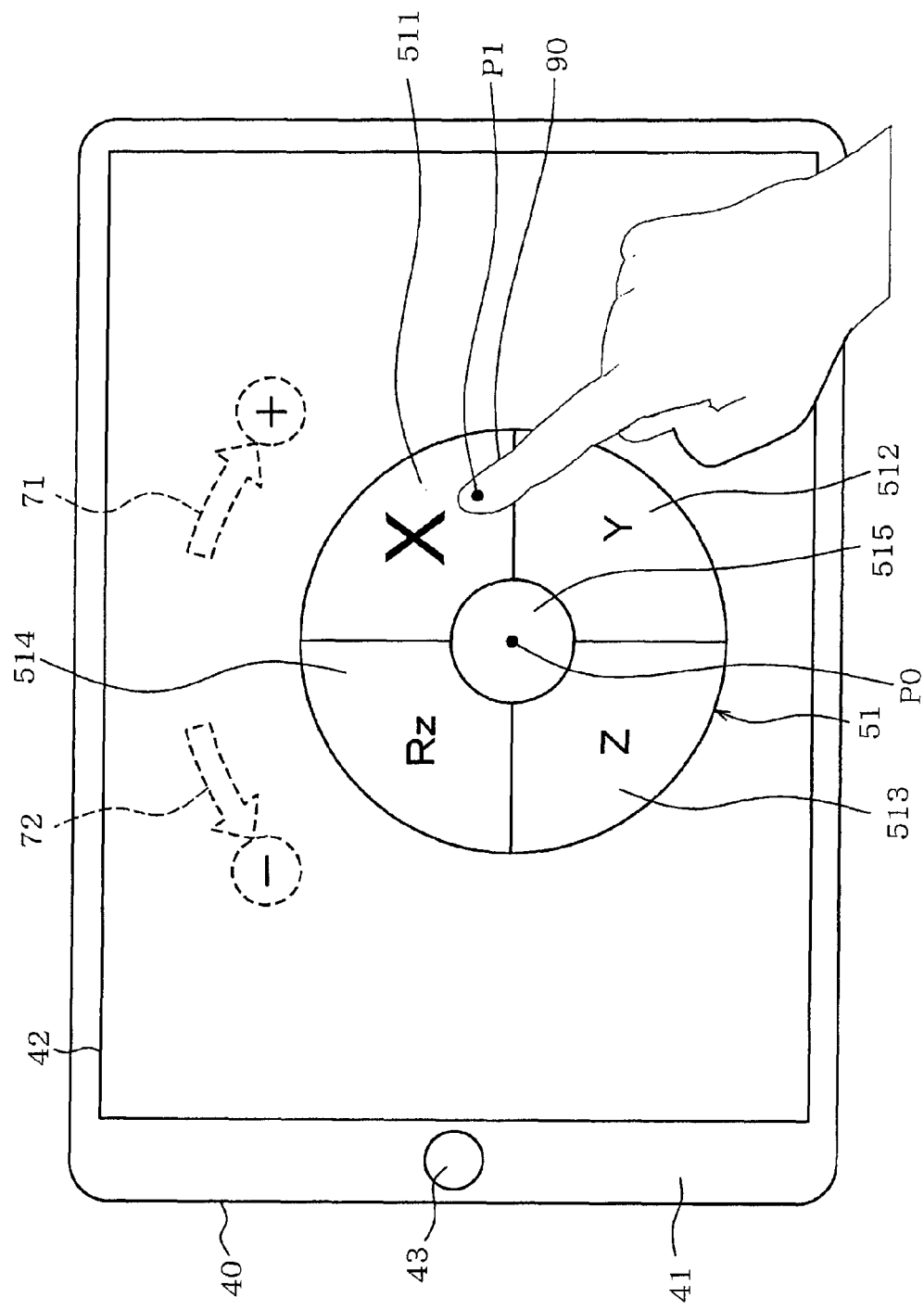
FIG. 10 is a diagram showing an example of the operation graphic displayed on the touch panel display when touch operation is input to a selection area of the operation graphic according to the first embodiment.

After completion of S13, the controller 45 controls the behavior command generator 47 to set the behavior mode of the manual operation of the robots 20 and 30 to the behavior mode allocated to the touched selection area in S12. For example, when the user touches the first selection area 511 in the four-axis fingertip system operation graphic 51, the controller 45 sets the behavior mode of the robot 20 to the behavior mode of the fingertip system in the X direction as illustrated in FIG. 10. In this case, the controller 45 controls the display controller 48 to display an indication "X" in the first selection area 511 selected by touch operation in a more noticeable manner than indications "Y", "Z", and "Rz" in the other not-touched selection areas 512 to 514 while increasing the size of the indication "X" than the sizes of the other indications, or changing the color of the indication "X". In this case, the user is capable of visually checking the behavior mode selected by user's own touch operation. Accordingly, operability improves.

Subsequently to the touch operation detected in S12, in S13 in FIG. 4, the controller 45 determines whether or not drag operation in the rotation circumferential direction of the operation graphic 51, 52, 61, or 62 has been input, that is, drag operation in the circumferential direction with respect to the rotation center P0 has been input. In this case, the rotation circumferential direction of the operation graphics 51, 52, 61, and 62 refers to a circumferential direction of a circle drawn by a locus of an arbitrary point different from the rotation center P0 in the operation graphics 51, 52, 61, and 62 on the assumption that the operation graphics 51, 52, 61, and 62 are virtually rotated around the rotation center P0 disposed at an arbitrary point in the operation graphics 51, 52, 61, and 62. In this embodiment, the rotation center P0 is disposed at the center P0 of each of the operation graphics 51, 52, 61, and 62. In the following description, drag operation in the rotation circumferential direction of the operation graphics 51, 52, 61, and 62 is simply referred to as drag operation.

When no drag operation is detected (NO in S14), the controller 45 executes S22 in FIG. 5. When drag operation is detected (YES in S14), the controller 45 executes S15. In S15, the controller 45 determines whether the operation direction of the drag operation is the positive direction indicated by an arrow of the positive direction graphic 71, or the negative direction indicated by an arrow of the negative direction graphic 72.

When the operation direction of the drag operation is the positive direction (the positive direction in S15), the controller 45 executes a behavior direction determination process in S16 to set a behavior direction of the robots 20 and 30 to the positive direction. When the operation direction of the drag operation is the negative direction (negative direction in S15), the controller 45 executes the behavior direction determination process in S17 to set the behavior direction of the robots 20 and 30 to the negative direction. After completion of S16 or S17, the controller 45 executes S18 in FIG. 5.

In S18, the controller 45 executes a behavior speed determination process. The behavior speed determination process is a process for determining a behavior speed Vr of the robots 20 and 30 based on an operation speed of drag operation when the operation detector 46 detects drag operation in the rotation circumferential direction of the operation graphic 51, 52, 61, or 62 defined on the touch panel display 42. In this case, the concept of the operation speed of drag operation includes a circumferential speed Vd determined based on a shift distance per unit time, and an angular speed dθ determined based on the circumferential speed Vd and a distance from the rotation center. In this embodiment, the behavior speed determination process determines the behavior speed Vr of the robots 20 and 30 based on the angular speed dθ of drag operation with respect to the rotation center P0 defined in each of the operation graphics 51, 52, 61, and 62.

In this case, the circumferential speed Vd of drag operation refers to a shift distance of an operation position P1 of drag operation per unit time in the rotation circumferential direction of the operation graphics 51, 52, 61 and 62. Specifically, in case of drag operation drawing a circle around the rotation center P0, the circumferential speed Vd of the drag operation refers to circular-arc increase in a distance drawn by a locus of the operation position P1 of the drag operation per unit time. In case of drag operation drawing a circle around the rotation center P0, the angular speed dθ of drag operation refers to circular-arc increase in an angle drawn by a locus of the operation position P1 of the drag operation per unit time.

Figure 13:
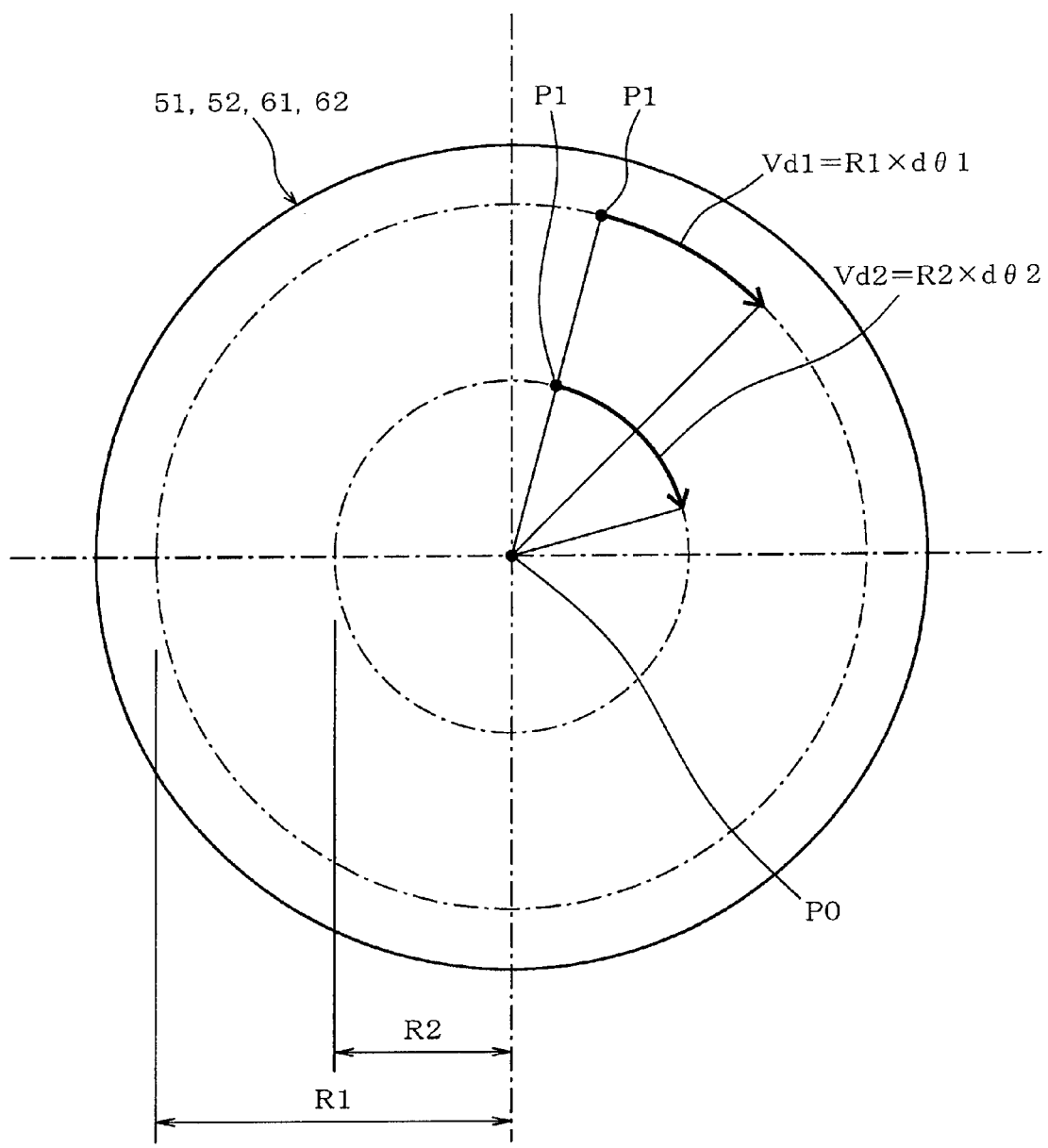
FIG. 13 is a diagram showing a relation between a circumferential speed and an angular speed of drag operation according to the first embodiment.

For example, in case of drag operation by the user drawing a circle having a radius R1 around the rotation center P0 as illustrated in FIG. 13, an angular speed dθ1 of the drag operation is expressed as dθ1=Vd1/R1 assuming that the circumferential speed of the drag operation is Vd1. In case of drag operation by the user drawing a circle having a radius R2 around the rotation center P0, an angular speed dθ2 of the drag operation is expressed as dθ2=Vd2/R2 assuming that the circumferential speed of the drag operation is Vd2. In this case, the angular speed dθ1 of the circle having the radius R1 becomes smaller than the angular speed dθ2 of the circle having the radius R2 when the circumferential speeds Vd of the circle having the radius R1 and the circle having the radius R2 are the same. In other words, when the circumferential speed Vd has a relation of Vd1=Vd2, the angular speed dθ is expressed as dθ1<dθ2. Accordingly, a change of the angular speed dθ of drag operation changeable in accordance with increase and decrease in the circumferential speed Vd of the drag operation decreases as the radius R of the circle drawn by the drag operation increases.

Figure 14:
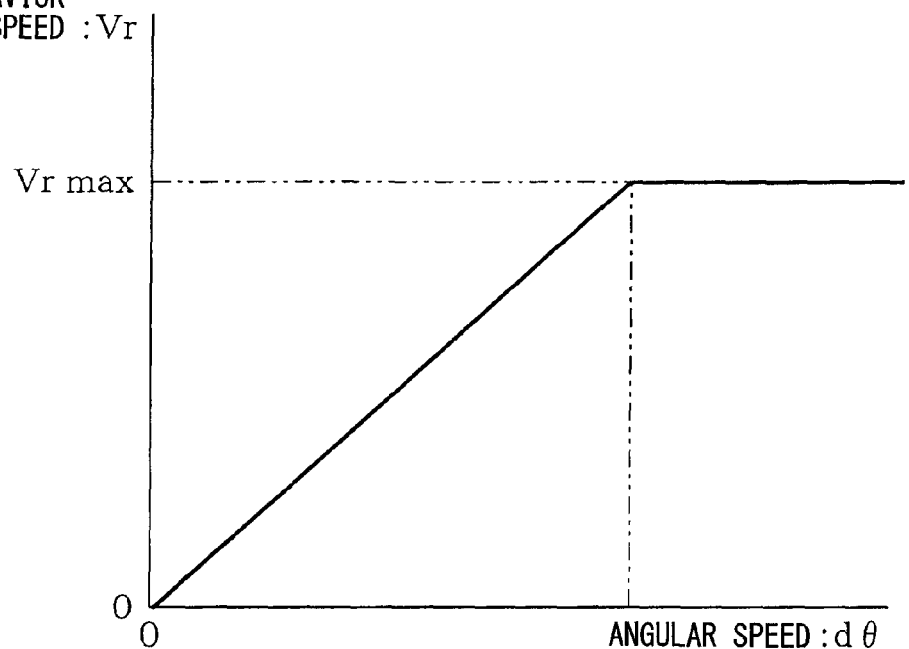
FIG. 14 is a diagram showing an example of a correlation between the angular speed of drag operation and a behavior speed of the robot according to the first embodiment.
Figure 15:
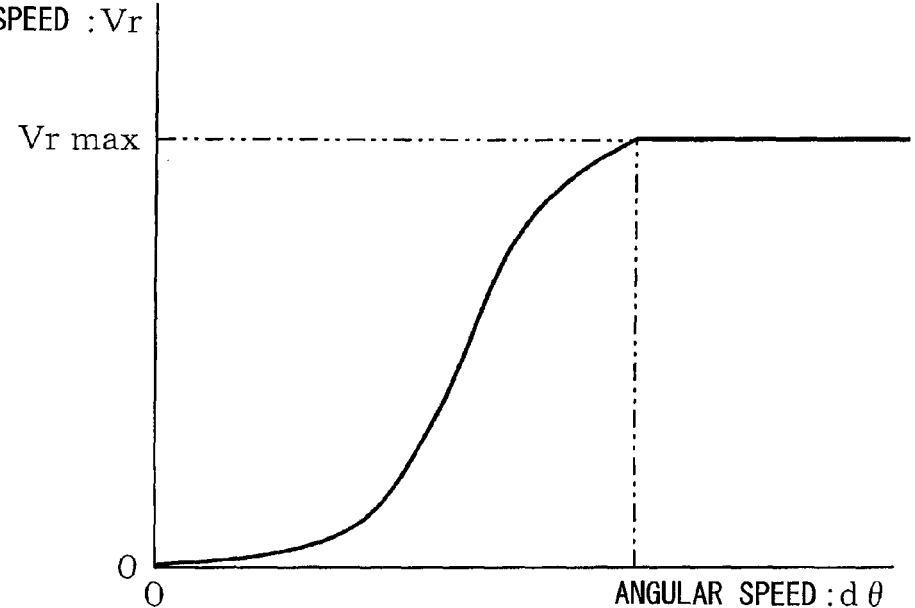
FIG. 15 is a diagram showing the correlation between the angular speed of drag operation and the behavior speed of the robot in an example different from the example in FIG. 14 according to the first embodiment.

The angular speed dθ and the behavior speed Vr of the robots 20 and 30 exhibit the following correlation. For example, the angular speed dθ and the behavior speed Vr of the robots 20 and 30 have a correlation expressed as a linear function as illustrated in FIG. 14. In this case, the behavior speed Vr of the robots 20 and 30 increases while exhibiting a linear function in proportion to increase in the angular speed dθ until the behavior speed Vr reaches a maximum behavior speed Vrmax. After reaching the maximum behavior speed Vrmax, the behavior speed Vr of the robots 20 and 30 is maintained at the maximum behavior speed Vrmax even when the angular speed dθ continuously increases. Alternatively, the angular speed dθ and the behavior speed Vr of the robots 20 and 30 may have a correlation expressed as a high-degree function as illustrated in FIG. 15. In this case, the behavior speed Vr of the robots 20 and 30 increases while exhibiting a high-degree function in proportion to increase in the angular speed dθ until the behavior speed Vr reaches the maximum behavior speed Vrmax. After reaching the maximum behavior speed Vrmax, the behavior speed Vr of the robots 20 and 30 is maintained at the maximum behavior speed Vrmax even when the angular speed dθ continuously increases.

In S19, the controller 45 executes a behavior command generating process to generate a behavior command for operating the robots 20 and 30 based on the behavior mode of the robots 20 and 30 determined in the behavior mode determination process (S13), the behavior direction of the robots 20 and 30 determined in the behavior direction determination process (S16 and S17), and the behavior speed Vr of the robots 20 and 30 determined in the behavior speed determination process (S18). The behavior command is generated based on the behavior mode, behavior direction, and behavior speed. In S20, the controller 45 transmits the behavior command generated in S19 to the controller 11. The controller 11 operates the robots 20 and 30 based on the behavior command received from the teaching pendant 40.

In S21, the controller 45 executes an operation graphic display process to rotate the operation graphic 51, 52, 61, or 62 in accordance with a shift of the present position P1 of drag operation. The operation graphic is rotated based on the present position of the drag operation. In this case, when the user performs drag operation for dragging the operation graphic 51, 52, 61, or 62 in the rightward rotation direction, that is, the positive direction in this example, from the state illustrated in FIG. 10, the operation graphic 51, 52, 61, or 62 rotates rightward, that is, in the positive direction as indicated by an arrow A1 in FIG. 11. When the user performs drag operation for dragging the operation graphic 51, 52, 61, or 62 in the leftward rotation direction, that is, the negative direction in this example, from the state illustrated in FIG. 10, the operation graphic 51, 52, 61, or 62 rotates leftward, that is, in the negative direction as indicated by an arrow A2 in FIG. 12. In these cases, the angular speed for rotation of the operation graphic 51, 52, 61, or 62 is substantially equivalent to the angular speed dθ of the drag operation. Accordingly, the operation graphic 51, 52, 61, or 62 rotates in a manner following the present position P1 of the drag operation.

Subsequently, the controller 45 executes S22 in FIG. 5 to determine whether or not operation has ended based on a detection result by the operation detector 46. The operation end in this context refers to separation of the finger 90 of the user or the like from the touch panel display 42. In other words, the operation end is not determined only based on the condition that the circumferential speed Vd of drag operation becomes 0, that is, the angular speed dθ becomes 0.

In a state of continuation of drag operation (NO in S22 in FIG. 5), the controller 45 shifts to S13 in FIG. 4 to repeat S14 to S22. The processes in S15 to S22 are repeated for every 0.5 second, for example. In this case, a considerable time difference is not produced between input of drag operation, motion of the robots 20 and 30, and rotation of the operation graphics 51, 52, 61, and 62. Accordingly, the user rotating the operation graphics 51, 52, 61, and 62 has such an impression that the user is manually operating the robots 20 and 30 substantially on real-time basis.

After determination of the behavior mode in S13 and the motion direction in S16 and S17, the user is capable of continuing motion of the robots 20 and 30 in the same mode and behavior direction by continuing drag operation in the positive direction or negative direction, that is, by continuing rotation of the operation graphic 51, 52, 61, or 62 in the positive direction or negative direction. Moreover, the user is capable of changing the behavior direction of the robots 20 and 30 to the positive or negative direction by changing the rotation direction of drag operation to the positive or negative direction before separating the finger 90 or the like associated with the drag operation from the touch panel display 42.

When determining that drag operation has ended based on a detection result by the operation detector 46 (YES in S22), the controller 45 executes S23. In S23, the controller 45 cancels, that is, initializes the settings of the behavior mode and behavior direction of the robots 20 and 30 determined by the foregoing processes. The settings of the behavior mode, behavior direction, and behavior speed are initialized by this step. A series of processes are completed, and therefore motion of the robots 20 and 30 ends. Thereafter, the controller 45 returns to S11 in FIG. 4 to again execute the processes in S11 to S23. The user is therefore allowed to execute manual operation in a new behavior mode and a new behavior direction. In other words, the user is allowed to change the behavior mode and behavior direction of the robots 20 and 30.

Once the behavior mode is set in this embodiment, the set behavior mode is maintained until initialization of the settings in S23. Accordingly, in case of continuous input of flick operation, the behavior mode is determined by initial flick operation, and maintained without the need of setting the behavior mode for every input of flick operation. Accordingly, the robots 20 and 30 continue motion in the behavior mode set by initial flick operation input to any position of the operation graphic 51 or the like until initialization of the settings after a stop of the robots 20 and 30.

In this embodiment, the controller 45 controls the behavior command generator 47 to perform the behavior speed determination process. The behavior speed determination process is a process for determining the behavior speed Vr of the robots 20 and 30 based on the operation speed of drag operation when the operation detector 46 detects the drag operation in the rotation circumferential direction of the circular operation graphic 51, 52, 61 or 62 defined on the touch panel display 42.

In this structure, the behavior speed Vr of the robots 20 and 30 is determined based on the operation speed of drag operation performed in the rotational circumferential direction of the operation graphic 51, 52, 61, or 62 defined on the touch panel display 42. Accordingly, the user is capable of continuing motion of the robots 20 and 30 at the behavior speed Vr responsive to the operation speed of drag operation by performing drag operation in such a manner as to draw a circle for the operation graphic 51, 52, 61, or 62 defined on the touch panel display 42.

When the user continues drag operation in such a manner as to draw a circle at a high operation speed in the rotation circumferential direction of the operation graphic 51, 52, 61, or 62, for example, the robots 20 and 30 continue motion at the high behavior speed Vr responsive to the high operation speed of the drag operation. When the user continues drag operation in such a manner as to draw a circle at a low operation speed in the rotation circumferential direction of the operation graphic 51, 52, 61, or 62, for example, the robots 20 and 30 continue motion at the low behavior speed Vr responsive to the low operation speed of the drag operation. The robots 20 and 30 stop in response to a stop of drag operation by the user.

Accordingly, the teaching pendant 40 of this embodiment continues motion of the robots 20 and 30 in accordance with continuation of movement of the finger 90 of the user or the like in a manner drawing a circle, and stops the robots 20 and 30 in accordance with a stop of the finger 90 of the user or the like. In this case, the behavior speed Vr of the robots 20 and 30 is controllable by the user in accordance with control of the shift speed of the finger 90 of the user or the like. Accordingly, the user easily obtains such an impression that the movement of the finger 90 of the user or the like produced by drag operation by the user and the motion of the robots 20 and 30 are associated with each other. In this condition, the user is capable of directly and intuitively determining the correlation between the drag operation performed by the user and the motion of the robots 20 and 30 performed in accordance with the drag operation. As a result, operability for the user improves.

Moreover, with the teaching pendant 40 of this embodiment, the user is capable of continuing motion of the robots 20 and 30 by continuing drag operation in such a manner as to draw a circle on the touch panel display 42. This structure allows the user to continue drag operation for operating the robots 20 and 30 without limitation to the screen size of the touch panel display 42. In this case, an unintended stop of motion of the robots 20 and 30 as a result of discontinuation of drag operation caused by limitation to the screen size of the touch panel display 42 is avoidable, for example. Accordingly, operability improves.

In addition, in the structure which allows continuation of drag operation for operating the robots 20 and 30 without limitation to the screen size of the touch panel display 42, size reduction of the touch panel display 42 is achievable. Even when the teaching pendant 40 is constituted by a watch-shaped terminal wearable on the wrist of the user, for example, the user is capable of appropriately performing manual operation of the robots 20 and 30 through a small screen on the wearable terminal.

With the teaching pendant 40 of this embodiment, the controller 45 controls the behavior command generator 47 to perform the behavior direction determination process. The behavior direction determination process sets the behavior direction of the robots 20 and 30 to the positive direction when the operation direction of drag operation is the positive direction, that is, rightward direction in this example, for the rotation circumference direction of the operation graphic 51, 52, 61, or 62, or sets the behavior direction of the robots 20 and 30 to the negative direction when the operation direction of drag operation is the negative direction, that is, leftward direction in this example, for the rotation circumference direction of the operation graphic 51, 52, 61, or 62. In this structure, the behavior direction of the robots 20 and 30 is determined based on the operation direction of drag operation for the rotation circumferential direction of the operation graphic 51, 52, 61, or 62.

In this case, the operation direction of drag operation in the rotation circumferential direction of the operation graphic 51, 52, 61, or 62 is either the positive or negative direction for the rotation circumferential direction of the operation graphic 51, 52, 61, or 62. This structure determines the positive or negative direction of the behavior direction of the robots 20 and 30 when the user performs drag operation in the rotation circumferential direction of the operation graphic 51, 52, 61, or 62. Accordingly, the user is capable of performing both operation for determining the behavior direction of the robots 20 and 30, and operation for determining the behavior speed of the robots 20 and 30 by a series of drag operation without the necessity of additional operation for determining the behavior direction of the robots 20 and 30. As a result, operability improves with reduced labor.

The operation graphics 51, 52, 61, and 62 include multiple selection areas 511 to 514, 521 to 524, 611 to 616, and 621 to 626, respectively. The selection areas 511 to 514, 521 to 524, 611 to 616, and 621 to 626 are areas to which the behavior modes of the robots 20 and 30 are allocated. The controller 45 controls the behavior command generator 47 to perform the behavior mode determination process. The behavior mode determination process is a process for setting the behavior mode of the robots 20 and 30 to the behavior mode allocated to the touched area of the selection areas 511 to 514, 521 to 524, 611 to 616, and 621 to 626 when the operation detector 46 detects touch operation for any one of the selection areas 511 to 514, 521 to 524, 611 to 616, and 621 to 626.

In this structure, the user is capable of selecting the behavior mode of the robots 20 and 30 by touching any one of the selection areas 511 to 514, 521 to 524, 611 to 616, and 621 to 626 of the operation graphics 51, 52, 61, and 62. Specifically, in case of drag operation for determining the behavior speed Vr of the robots 20 and 30, touch operation is always performed for the touch panel display 42 before the drag operation. With the teaching pendant 40 of this embodiment, the user is capable of selecting the behavior mode of the robots 20 and 30 by performing touch operation always required for determining the behavior speed Vr of the robots 20 and 30. Accordingly, the necessity of additional operation for selecting the behavior mode of the robots 20 and 30 is eliminated, and therefore operability improves with a reduced number of operations.

The controller 45 controls the display controller 48 to perform an operation graphic display process. The operation graphic display process is a process for displaying the operation graphics 51, 52, 61, and 62 on the touch panel display 42. In this structure, the user performing drag operation with reference to the operation graphics 51, 52, 61, and 62 displayed on the touch panel display 42 is capable of easily determining the direction of drag operation. As a result, operability further improves.

The operation graphic display process includes a process for rotating the operation graphic 51, 52, 61, or 62 in accordance with a shift of the present position P1 of drag operation, and for displaying the rotated operation graphic 51, 52, 61, or 62 on the touch panel display 42. In this structure, the user is capable of easily and visually checking whether or not the user is appropriately performing drag operation, for example, while viewing the operation graphic 51, 52, 61, or 62 rotating in accordance with the drag operation by the user. As a result, further intuitive operation is achievable, and thus the user obtains more preferable operational feeling.

The behavior speed determination process is a process for determining the behavior speed Vr of the robots 20 and 30 based on the angular speed $d\theta$ of drag operation with respect to the rotation center P0 defined in the operation graphics 51, 52, 61, and 62. Specifically, in case of drag operation in a manner drawing a circle around a certain center point, the rotation angle corresponding to the shift distance of the drag operation in the circumferential direction decreases as the operation position P1 associated with the drag operation comes farther from the center point, that is, as the radius of the circle drawn by the drag operation becomes larger. In other words, a change of the angular speed $d\theta$ of the drag operation, which changes in accordance with increase and decrease in the speed of the drag operation in the circumferential direction with respect to the center, that is, increase and decrease in the circumferential speed Vd, decreases as the radius of the circle drawn by the drag operation increases.

For example, as illustrated in FIG. 13, in case of drag operation by the user for drawing a circle having a large radius R1, the rotation angle decreases even when the shift distance associated with the drag operation in the circumferential direction is long. In other words, the user obtains a slow angular speed $d\theta 1$ at a high circumferential speed Vd1 by performing drag operation for drawing the circle having the large radius R1. This condition is advantageous at the time of fine adjustment, that is, fine movement of the fingertip positions of the robots 20 and 30. In this case, the user is capable of further decreasing a change of the behavior speed Vr of the robots 20 and 30 changeable in accordance with increase and decrease in the shift speed Vd of drag operation. Specifically, when the circumferential speed Vd of drag operation is constant, the user is capable of operating the robots at a lower behavior speed by performing drag operation in a manner drawing a circle having the large radius R1, in comparison with the behavior speed of drag operation in a manner drawing a circle having a small radius R2.

In case of drag operation by the user for drawing the circle having the small radius R2, the rotation angle increases even when the shift distance associated with the drag operation in the circumferential direction is short. In other words, the user is capable of obtaining a high angular speed dθ2 at a slow circumferential speed Vd2 by performing drag operation for drawing the circle having the small radius R2. This condition is advantageous at the time of a large shift, that is, rough movement of the fingertip positions of the robots 20 and 30. In this case, the user is capable of further increasing a change of the behavior speed Vr of the robots 20 and 30 changeable in accordance with increase and decrease in the shift speed Vd of drag operation. Specifically, when the circumferential speed Vd of drag operation is constant, the user is capable of operating the robots 20 and 30 at the higher behavior speed Vr by performing drag operation in a manner drawing a circle having the small radius R2, in comparison with the behavior speed of drag operation in a manner drawing the circle having the large radius R1.

With the teaching pendant 40 of this embodiment, therefore, the user is capable of controlling a change of the behavior speed Vr of the robots 20 and 30 changeable in accordance with increase and decease in the circumferential speed Vd of drag operation by performing drag operation while controlling the distance from the rotation center P0 in each of the operation graphics 51, 52, 61, and 62 to the operation position P1 of the drag operation, that is, controlling the length of the radius R of the circle drawn by the drag operation. Accordingly, the user is capable of easily switching fine movement and rough movement of the robots 20 and 30 depending on use purposes. As a result, operability further improves.

In this embodiment, the shift distance of the robots 20 and 30 is calculated by multiplying the behavior speed Vr of the robots 20 and 30 by a motion time. Specifically, the shift distance of the robots 20 and 30 is proportional to the angular speed dθ of the operation graphics 51, 52, 61, and 62 multiplied by the motion time, that is, a rotation angle of the operation graphics 51, 52, 61, and 62. In other words, the shift distance of the robots 20 and 30 is proportional to the number of rotations of the operation graphics 51, 52, 61, and 62. For example, the shift distance of the robots 20 and 30 becomes longer as the number of rotations of the operation graphics 51, 52, 61, and 62 increases, while the shift distance of the robots 20 and 30 becomes shorter as the number of rotations of the operation graphics 51, 52, 61, and 62 decreases. Accordingly, the user is capable of controlling the shift distance of the robots 20 and 30 by controlling the number of rotations of the operation graphics 51, 52, 61, and 62. As a result, the shift distance of the robots 20 and 30 becomes easily adjustable, and thus operability further improves.

The behavior speed determination process includes a process for determining drag operation performed within the invalid areas 515, 525, 617, and 627 as invalid operation when the drag operation detected by the operation detector 46 is operation input to the invalid areas 515, 525, 617, 627 provided in the vicinity of the rotation center P0 in the respective operation graphics 51, 52, 61, and 62. Specifically, in the structure which determines the behavior speed Vr of the robots 20 and 30 in the basis of the angular speed dθ of drag operation, a change of the behavior speed Vr of the robots 20 and 30 with increase and decrease in the circumferential speed Vd of drag operation increases as the operation position P1 of the drag operation comes closer to the rotation center P0. Accordingly, when the operation position P1 of drag operation is located in the vicinity of the rotation center P0, slight drag operation performed by the user considerably affects motion of the robots 20 and 30. In this case, the scale of motion of the robots 20 and 30 may exceed the scale intended by the user.

With the teaching pendant 40 of this embodiment, however, the invalid areas 515, 525, 617, and 627 are defined in the vicinity of the rotation center P0 of each of the operation graphics 51, 52, 61, and 62. Drag operation input to the invalid area 515, 525, 617, or 627 is determined as invalid. This invalid drag operation is determined as no input of drag operation, and therefore motion of the robots 20 and 30 stops. Accordingly, when the operation position P1 of drag operation is located in the vicinity of the rotation center P0, the robots 20 and 30 are stopped for safety so as to avoid such a situation that slight drag operation input from the user considerably affects motion of the robots 20 and 30. This structure minimizes a problem that the scale of motion of robots 20 and 30 exceeds the scale intended by the user. As a result, safety improves.

In this embodiment, the behavior mode of the fingertip system of the four-axis robot 20 in the Z direction is equivalent to the behavior mode for driving the third axis J23 of the axis system, while the behavior mode of the fingertip system of the four-axis robot 20 in the Rz direction is equivalent to the behavior mode for driving the fourth axis J24 of the axis system. The behavior mode of the fingertip system of the six-axis robot 30 in the Rx direction is equivalent to the behavior mode for driving the fourth axis J34 of the axis system, the behavior mode of the fingertip system of the six-axis robot 30 in the Ry direction is equivalent to the behavior mode for driving the fifth axis J35 of the axis system, and the behavior mode of the fingertip system of the six-axis robot 30 in the Rz direction is equivalent to the behavior mode for driving the sixth axis J36 of the axis system.

With the teaching pendant 40 of this embodiment, therefore, the behavior modes for driving the equivalent axes in the fingertip system and in the axis system are allocated to the selection areas disposed at the equivalent positions in the respective operation graphics. For example, as for the operation graphics 51 and 52 for the four-axis robot 20, the behavior modes of the fingertip system in the Z direction and of the third axis J23 of the axis system are allocated to the third selection areas 513 and 523 disposed at the equivalent positions in the operation graphics 51 and 52 as illustrated in FIG. 6 and FIG. 7. The behavior modes of the fingertip system in the Rz direction and of the fourth axis J24 of the axis system are allocated to the fourth selection areas 514 and 524 disposed at the equivalent position in the operation graphics 51 and 52.

As for the operation graphics 61 and 62 for the six-axis robot 30, for example, the behavior modes of the fingertip system in the Rx direction and of the fourth axis J34 of the axis system are allocated to the fourth selection areas 614 and 624 disposed at the equivalent positions in the operation graphics 61 and 62 as illustrated in FIG. 8 and FIG. 9. The behavior modes of the fingertip system in the Ry direction and of the fifth axis J35 of the axis system are allocated to the fifth selection areas 615 and 625 disposed at the equivalent positions in the operation graphics 61 and 62. Furthermore, the behavior modes of the fingertip system in the Rz direction and of the sixth axis J36 of the axis system are allocated to the sixth selection areas 616 and 626 disposed at the equivalent positions in the operation graphics 61 and 62.

According to this structure, the behavior modes corresponding to equivalent movement in the axis system and in the fingertip system are allocated to the selection areas disposed at the equivalent positions. In this case, the user is not required to memorize the allocations of the behavior modes to the respective selection areas for each operation system. Accordingly, operation errors such as erroneous selection of the selection area by the user are reduced to the minimum at the time of switching of the manual operation between the fingertip system and the axis system. As a result, operability and safety further improve.

The robot operation programs according to this embodiment can be executed by a general-purpose tablet-type PC, a smartphone or the like provided with a touch panel display, for example. In this case, the general-purpose tablet-type PC, the smartphone or the like obtains a function equivalent to the foregoing teaching pendant 40.

In this embodiment described herein, the user is capable of operating the robots 20 and 30 by inputting touch operation and drag operation to the touch panel display 42. In this structure, the user is capable of more intuitively and easily performing manual operation than in a structure requiring operation of physical operation keys. Moreover, elimination of physical operation keys for performing manual operation is achievable. This structure is therefore expected to offer advantageous effects such as size reduction of the teaching pendant 40, screen size enlargement of the touch panel display 42, and cost reduction.

Figure 16:
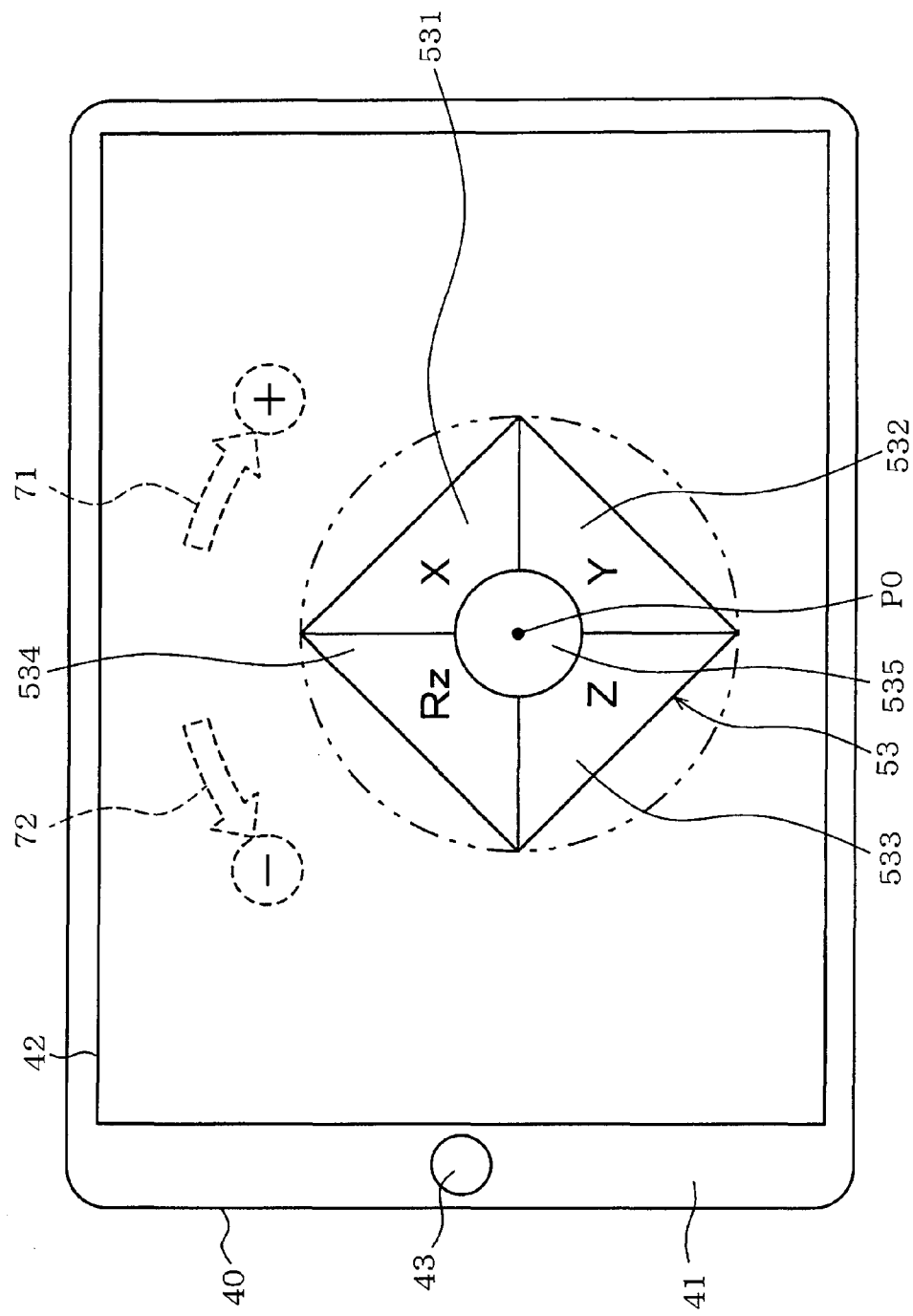
FIG. 16 is a diagram showing an operation graphic displayed on the touch panel display when manual operation of the four-axis robot is performed in an example different from the examples in FIG. 6 and FIG. 7 according to the first embodiment.
Figure 17:
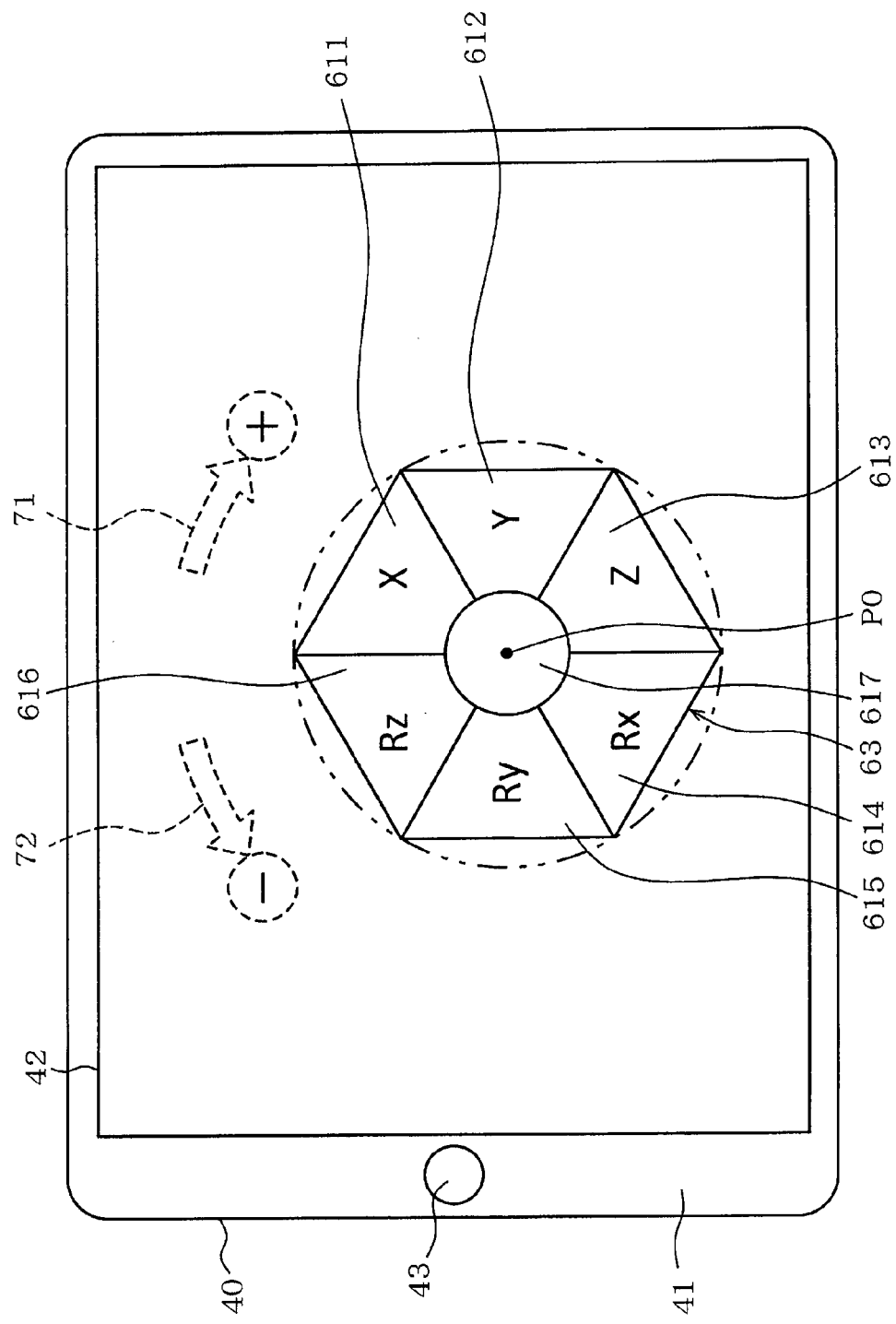
FIG. 17 is a diagram showing an operation graphic displayed on the touch panel display when manual operation of the six-axis robot is performed in an example different from the examples in FIG. 8 and FIG. 9 according to the first embodiment.

The shapes of the operation graphics 51, 52, 61, and 61 are not limited to circular, but may be polygonal shapes or like shapes other than circular shapes as illustrated in FIG. 16 and FIG. 17. For example, the operation graphic 53 for the four-axis robot 20 illustrated in FIG. 16 has a rectangular shape. In this structure, an operation graphic 53 includes selection areas 531 to 534 and an invalid area 535 similarly to the foregoing operation graphics 51 and 52 for the four-axis robot 20. An operation graphic 63 for the six-axis robot 30 illustrated in FIG. 17 has a hexagonal shape, for example. In this structure, the operation graphic 63 includes selection areas 631 to 636 and an invalid area 637 similarly to the foregoing operation graphics 61 and 62 for the six-axis robot 30.

Figure 18:
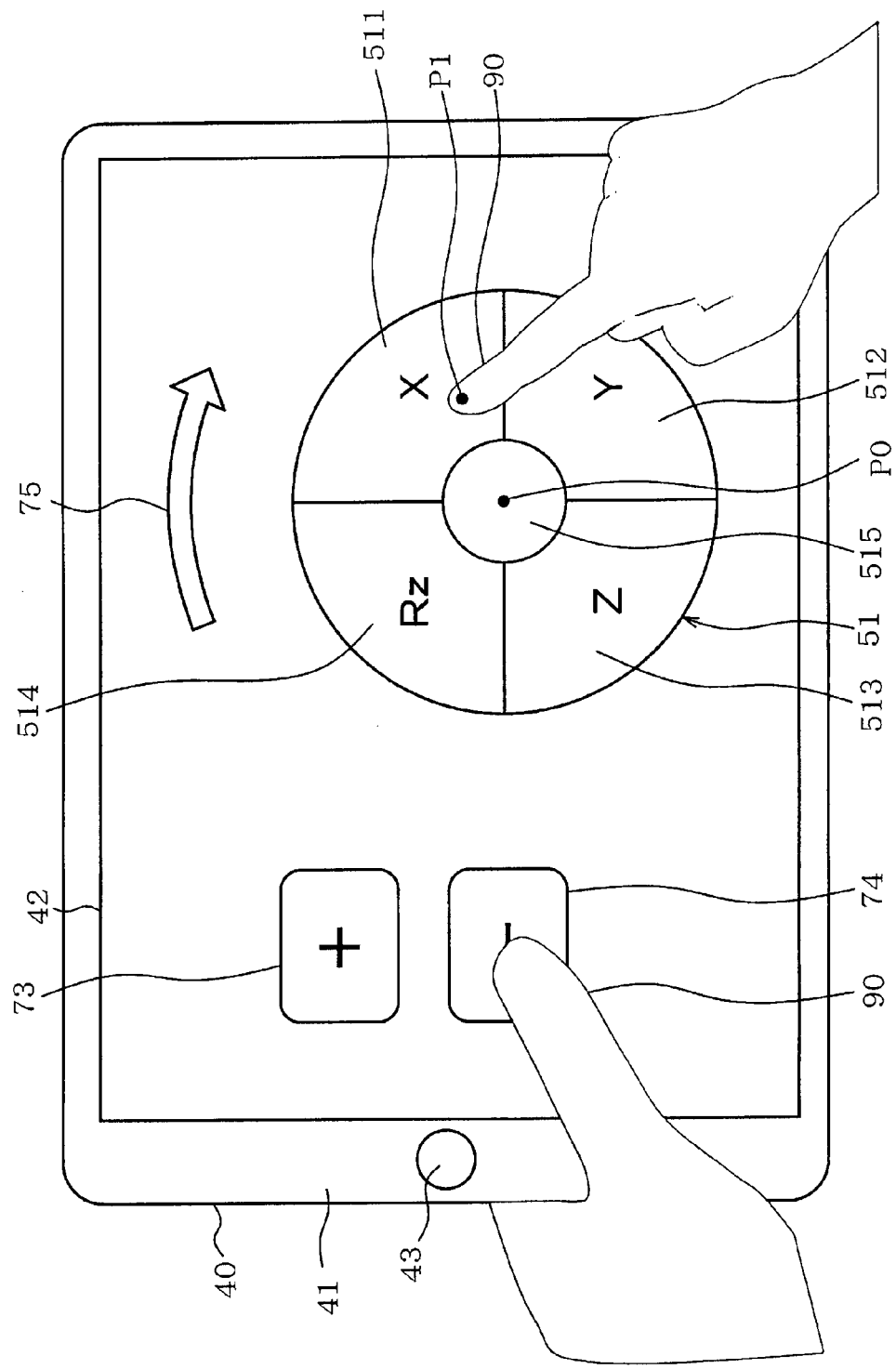
FIG. 18 is a diagram showing an example that determines a behavior mode of the robot by using a button according to the first embodiment.

As illustrated in FIG. 18, the operation direction determination process may determine the behavior direction of the robots 20 and 30, based on touch operation input to a positive direction button 73 or a negative direction button 74. The positive direction button 73 and the negative direction button 74 are buttons displayed on the touch panel display 42. The positive direction button 73 is used for operating the robots 20 and 30 in the positive direction. The negative direction button 74 is used for operating the robots 20 and 30 in the negative direction.

The user performs drag operation for rotating the operation graphic 51, 52, 61, or 62 in a predetermined direction while touching the positive direction button 73 to operate the robots 20 and 30 in the positive direction in the behavior mode determined in S13. The user performs drag operation for rotating the operation graphic 51, 52, 61, or 62 in a predetermined direction while touching the negative direction button 74 to operate the robots 20 and 30 in the negative direction in the behavior mode determined in S13. In these cases, the direction of rotation of the operation graphics 51, 52, 61, and 62 may be or may not be limited to the rightward or leftward rotation. As illustrated in FIG. 18, a direction graphic 75 indicating the direction of rotation of the operation graphics 51, 52, 61, and 62 may be displayed on the touch panel display 42.

Second Embodiment

A second embodiment will hereinafter be described. In this embodiment, a behavior speed determination process determines the behavior speed Vr of the robots 20 and 30 based on the circumferential speed Vd of drag operation with respect to the rotation center P0 defined in each of the operation graphics 51, 52, 61, and 62. Specifically, in the structure which determines the behavior speed Vr of the robots 20 and 30 based on the angular speed dθ of drag operation as in the first embodiment, the behavior speed Vr of the robots 20 and 30 is calculated based on values of the operation position P1 and the circumferential speed Vd of the drag operation. Accordingly, control of the two values of the operation position P1 and the circumferential speed Vd of drag operation is needed for determining the behavior speed Vr of the robots 20 and 30. For a skilled person, simultaneous control of the two values of the operation position P1 and the circumferential speed Vd of drag operation is relatively easy. However, for a beginner of operation, simultaneous control of the two values of the operation position P1 and the circumferential speed Vd of drag operation is relatively difficult.

For example, in the structure which determines the behavior speed Vr of the robots 20 and 30 based on the angular speed dθ of drag operation, the behavior speed Vr of the robots 20 and 30 changes with a change of the size of the circle drawn by the drag operation or a distance between the rotation center P0 and the operation position P1 of the drag operation even when the circumferential speed Vd of the drag operation is constant. Accordingly, when the radius of the actual circle drawn by drag operation changes, or when the center of the circle deviates from the rotation center P0 defined in each of the operation graphics 51, 52, 61, and 62, the distance between the rotation center P0 and the operation position P1 of the drag operation changes even in case of drag operation at the constant circumferential speed Vd performed by the user intending to operate the robots 20 and 30 at a constant speed. This condition varies the behavior speed Vr of the robots 20 and 30, thereby easily producing motion not meeting the intention of the user for operating the robots 20 and 30 at a constant speed.

In this embodiment, however, the behavior speed Vr of the robots 20 and 30 is determined based on the circumferential speed Vd of drag operation with respect to the rotation center P0 defined in each of the operation graphics 51, 52, 61, and 62. In this case, the behavior speed Vr of the robots 20 and 30 is determined based on the circumferential speed Vd of drag operation regardless of the distance between the rotation center P0 and the operation position P1 of the drag operation, that is, the radius of the circle drawn by the drag operation. For example, the behavior speeds Vr of the robots 20 and 30 in FIG. 13 become identical when Vd1=Vd2.

With the teaching pendant 40 of this embodiment, therefore, the circumferential speed Vd of drag operation is directly reflected on the behavior speed Vr of the robots 20 and 30. In this case, the user is allowed to perform drag operation without considering the distance between the rotation center P0 and the operation position P1 of the drag operation, that is, the radius of the circle drawn by the drag operation or deviation from the rotation center P0. Accordingly, even a beginner can perform operation relatively easily, and therefore operability improves from a viewpoint different from the viewpoint of the foregoing structure which determines the behavior speed Vr of the robots 20 and 30 based on the circumferential speed Vd of drag operation.

In this embodiment, the shift distance of the robots 20 and 30 is proportional to the circumferential speed Vd of drag operation multiplied by an operation time. In other words, the shift distance of the robots 20 and 30 is proportional to the shift distance of the finger 90 or the like associated with drag operation. Accordingly, the user is capable of controlling the shift distance of the robots 20 and 30 by controlling the shift distance of the finger 90 or the like associated with drag operation regardless of the position of drag operation. As a result, the shift distance of the robots 20 and 30 becomes more easily adjustable, and therefore operability improves from a viewpoint different from the viewpoint of the teaching pendant 40 of the first embodiment.

Third Embodiment

A third embodiment will hereinafter be described with reference to FIG. 19 and FIG. 20.

In the embodiments described above, motions in the X direction or Y direction are achievable in the behavior modes of the fingertip system, for example. However, in a teaching situation of the robots 20 and 30, it is more advantageous to operate the robots 20 and 30 in a combination of multiple behavior modes, such as behavior modes in the X-Y plane. For realizing this purpose, the teaching pendant 40 of this embodiment operates the robots 20 and 30 in a combination of multiple behavior modes.

Discussed hereinbelow is a case in which the robots 20 and 30 are operated in the X-Y plane direction. An operation graphic 54 illustrated in FIG. 19 is used for operation of the fingertip system of the four-axis robot 20. The operation graphic 54 includes selection areas 541 to 552 in addition to the selection areas 511 to 515 of the operation graphic 51 for the four-axis fingertip system of the first embodiment. Behavior modes in arbitrary plane directions and arbitrary angle directions are allocated to the respective selection areas 541 to 552 beforehand.

In this embodiment, behavior modes in the X-Y plane direction and in three angle directions, that is, directions of 30°, 45°, and 60° in each of quadrants in this case, are allocated to the respective selection areas 541 to 552. In this embodiment, the positive (+) X direction in the X-Y plane is defined as a reference, that is, 0° as illustrated in FIG. 20. The positive (+) X and positive (+) Y direction corresponds to the first quadrant. The negative (−) X and positive (+) Y direction corresponds to the second quadrant. The negative (−) X and negative (−) Y direction corresponds to the third quadrant. The positive (+) X and negative (−) Y direction corresponds to the fourth quadrant.

Behavior modes in the first quadrat in the X-Y plane direction are allocated to the selection areas 541, 542, and 543. Specifically, a behavior mode in the direction of 30° as indicated by an arrow B1 in FIG. 20 is allocated to the selection area 541. A behavior mode in the direction of 45° as indicated by an arrow B2 is allocated to the selection area 542. A behavior mode in the direction of 60° as indicated by an arrow B3 is allocated to the selection area 543. Behavior modes in the second quadrat in the X-Y plane direction are allocated to the selection areas 544, 545, and 546. Specifically, a behavior mode in the direction of 120° as indicated by an arrow C1 is allocated to the selection area 544. A behavior mode in the direction of 135° as indicated by an arrow C2 is allocated to the selection area 545. A behavior mode in the direction of 150° as indicated by an arrow C3 is allocated to the selection area 546.

Behavior modes in the third quadrant in the X-Y plane direction are allocated to the selection areas 547, 548, and 549. Specifically, a behavior mode in the direction of −150° as indicated by an arrow D1 is allocated to the selection area 547. A behavior mode in the direction of −135° as indicated by an arrow D2 is allocated to the selection area 548. A behavior mode in the direction of −120° as indicated by an arrow D3 is allocated to the selection area 549. Behavior modes in the fourth quadrat in the X-Y plane direction are allocated to the selection areas 550, 551, and 552. More specifically, a behavior mode in the direction of −60° as indicated by an arrow E1 is allocated to the selection area 550. A behavior mode in the direction of −45° as indicated by an arrow E2 is allocated to the selection area 551. A behavior mode in the direction of −30° as indicated by an arrow E3 is allocated to the selection area 552.

Figure 19:
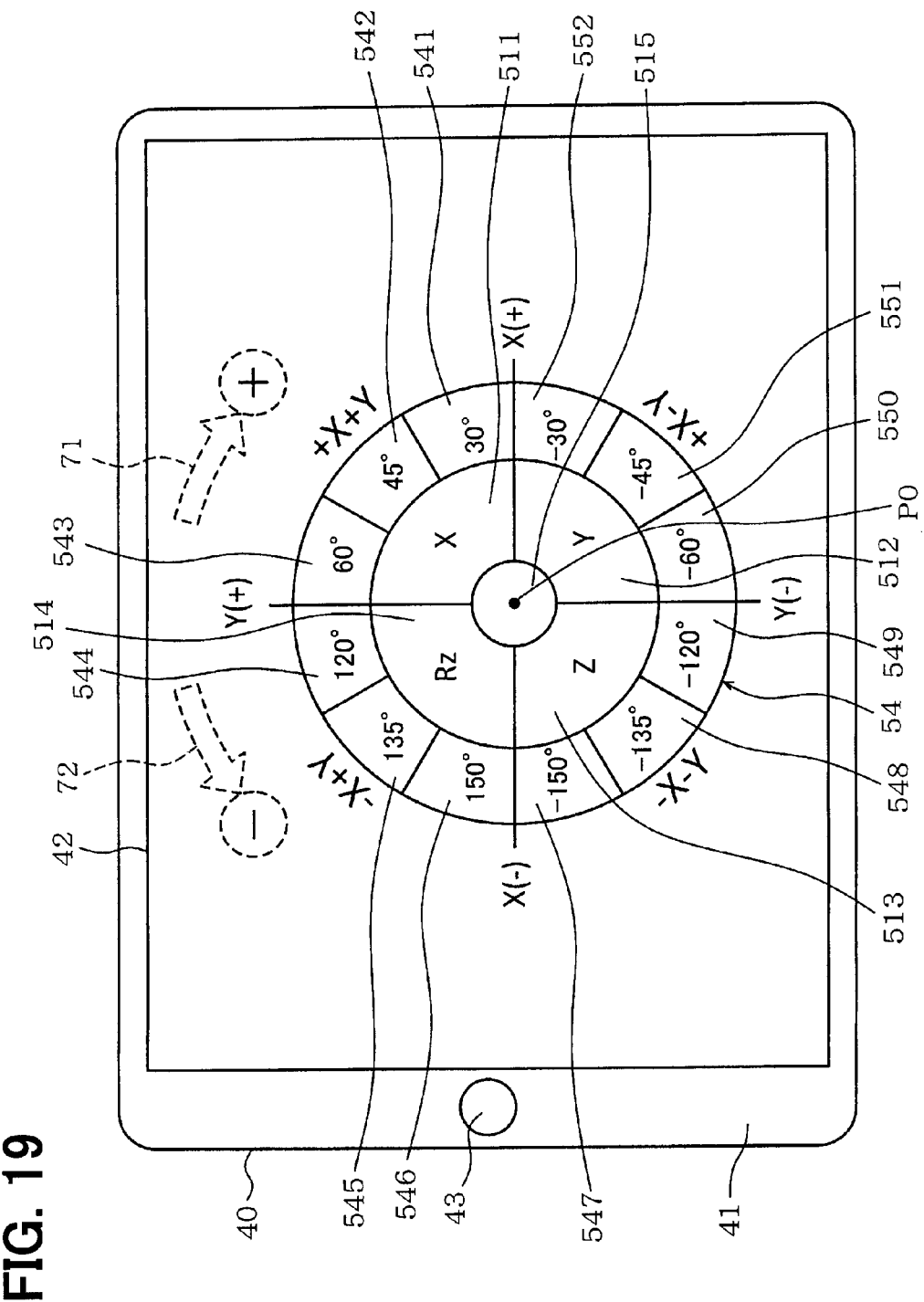
FIG. 19 is a diagram showing an example of an operation graphic displayed on the touch panel display when manual operation of the fingertip system of the four-axis robot is performed according to a third embodiment.
Figure 20:
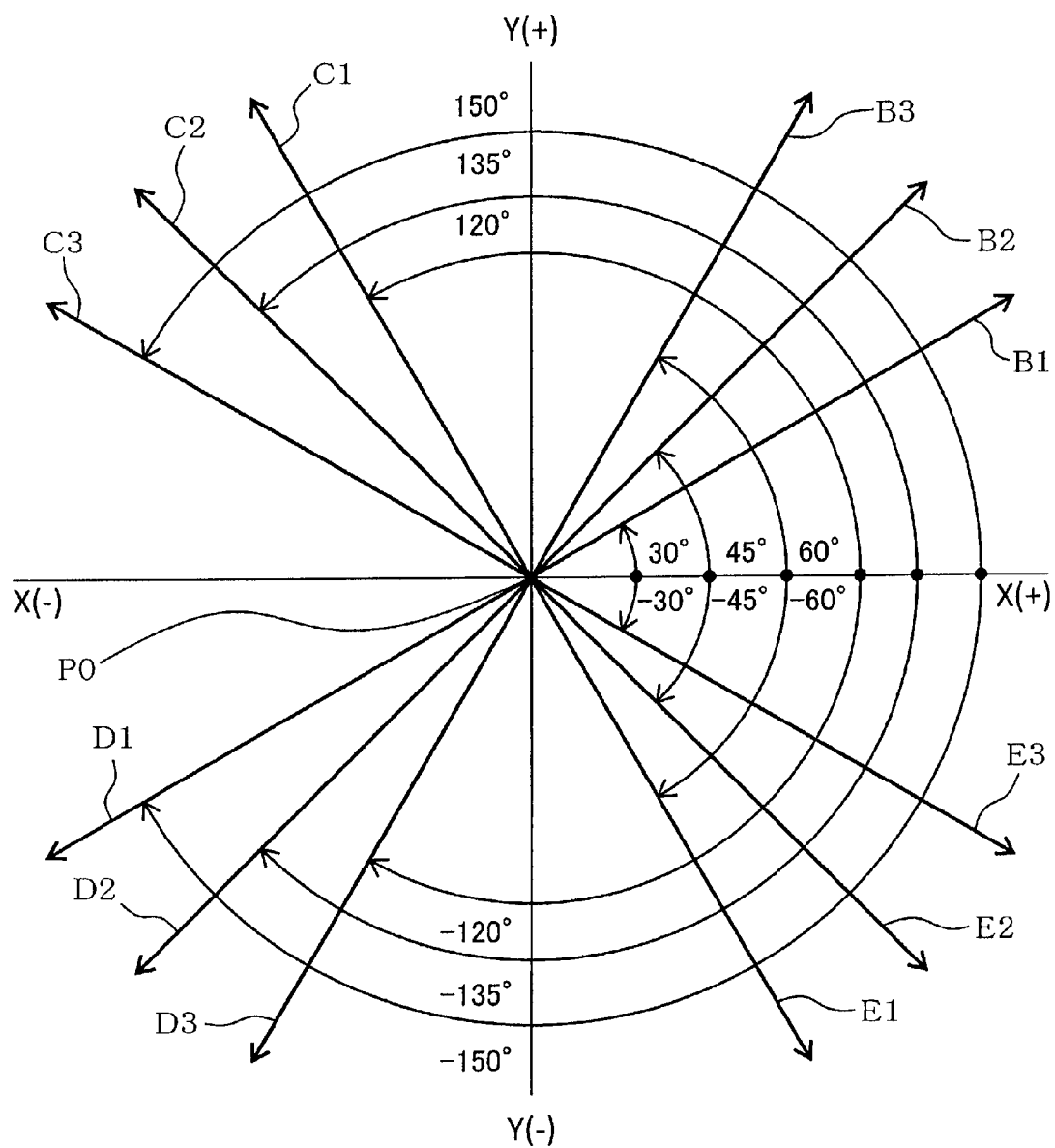
FIG. 20 is a diagram showing an example of shift directions of the robot allowed by manual operation according to the third embodiment.

When the user touches any one of the selection areas 541, 542, and 543 in the first quadrant of the operation graphic 54 illustrated in FIG. 19 and then drags the selected area in the positive direction in this structure, the robot 20 shifts in the angle direction responsive to the touched selection area 541, 542, or 543, that is, in any one of 30° indicated by the arrow B1, 45° indicated by the arrow B2, and 60° indicated by the arrow B3 in FIG. 20. When the user touches any one of the selection areas 541, 542, and 543 in the first quadrant of the operation graphic 54 illustrated in FIG. 19 and then drags the selected area in the negative direction, the robot 20 shifts in the direction opposite to the angle direction responsive to the touched selection area 541, 542, or 543, that is, in any one of −150° indicated by the arrow D1, −135° indicated by the arrow D2, and −120° indicated by the arrow D2 in FIG. 20.

When the user touches any one of the selection areas 544, 545, and 546 in the second quadrant of the operation graphic 54 illustrated in FIG. 19 and then drags the selected area in the positive direction, the robot 20 shifts in the angle direction responsive to the touched selection area 544, 545, or 546, that is, in any one of 120° indicated by the arrow C1, 135° indicated by the arrow C2, and 150° indicated by the arrow C3 in FIG. 20. When the user touches any one of the selection areas 544, 545, and 546 in the second quadrant of the operation graphic 54 illustrated in FIG. 19 and then drags the selected area in the negative direction, the robot 20 shifts in the direction opposite to the angle direction responsive to the touched selection area 544, 545, or 546, that is, in any one of −60° indicated by the arrow E1, −45° indicated by the arrow E2, and −30° indicated by the arrow E2 in FIG. 20.

When the user touches any one of the selection areas 547, 548, and 549 in the third quadrant of the operation graphic 54 illustrated in FIG. 19 and then drags the selected area in the positive direction, the robot 20 shifts in the angle direction responsive to the touched selection area 547, 548, or 549, that is, in any one of −150° indicated by the arrow D1, −135° indicated by the arrow D2, and −120° indicated by the arrow D2 in FIG. 20. When the user touches any one of the selection areas 547, 548, and 549 in the third quadrant of the operation graphic 54 illustrated in FIG. 19 and then drags the selected area in the negative direction, the robot 20 shifts in the direction opposite to the angle direction responsive to the touched selection area 547, 548, or 549, that is, in any one of 30° indicated by the arrow B1, 45° indicated by the arrow B2, and 60° indicated by the arrow B3 in FIG. 20.

When the user touches any one of the selection areas 550, 551, and 552 in the fourth quadrant of the operation graphic 54 illustrated in FIG. 19 and then drags the selected area in the positive direction, the robot 20 shifts in the angle direction responsive to the touched selection area 550, 551, or 552, that is, in any one of −60° indicated by the arrow E1, −45° indicated by the arrow E2, and −30° indicated by the arrow E2 in FIG. 20. When the user touches any one of the selection areas 550, 551, and 552 in the fourth quadrant of the operation graphic 54 illustrated in FIG. 19 and then drags the selected area in the negative direction, the robot 20 shifts in the direction opposite to the angle direction responsive to the touched selection area 550, 551, or 552, that is, in any one of 120° indicated by the arrow C1, 135° indicated by the arrow C2, and 150° indicated by the arrow C3 in FIG. 20.

In this embodiment, drag operation in the positive direction after touching the selection area 541, 542, or 543 in the first quadrant is equivalent to drag operation in the negative direction after touching the selection area 547, 548, or 549 in the third quadrant, and drag operation in the negative direction after touching the selection area 541, 542, or 543 in the first quadrant is equivalent to drag operation in the positive direction after touching the selection area 547, 548, or 549 in the third quadrant. Similarly, drag operation in the positive direction after touching the selection area 544, 545, or 546 in the second quadrant is equivalent to drag operation in the negative direction after touching the selection area 550, 551, or 552 in the fourth quadrant, and drag operation in the negative direction after touching the selection area 544, 545, or 546 in the second quadrant is equivalent to drag operation in the positive direction after touching the selection area 547, 548, or 549 in the fourth quadrant.

With the teaching pendant 40 of this embodiment, therefore, the robots 20 and 30 are operable in a mode combining multiple behavior modes such as modes in the X-Y plane direction. Accordingly, the robots 20 and 30 are operable in a variety of behavior modes. As a result, operability and usability improve.

In this embodiment, the circular operation graphic 54 is divided into four quadrants by X axis and Y axis which are orthogonal to each other as illustrated in FIG. 19. Behavior modes for the robot 20, 30 in the quadrants in the X-Y plane direction are allocated to the selection areas 541 to 552 in the quadrants of the operation graphic 54. In this structure, the user easily obtains such an impression that the selection areas 541 to 552 in the quadrants of the operation graphic 54 are positionally associated with the behavior modes of the robots 20 and 30 selectable via the selection areas 541 to 552. Accordingly, more intuitive operation is achievable, and therefore operability further improves.

Fourth Embodiment

Figure 21:
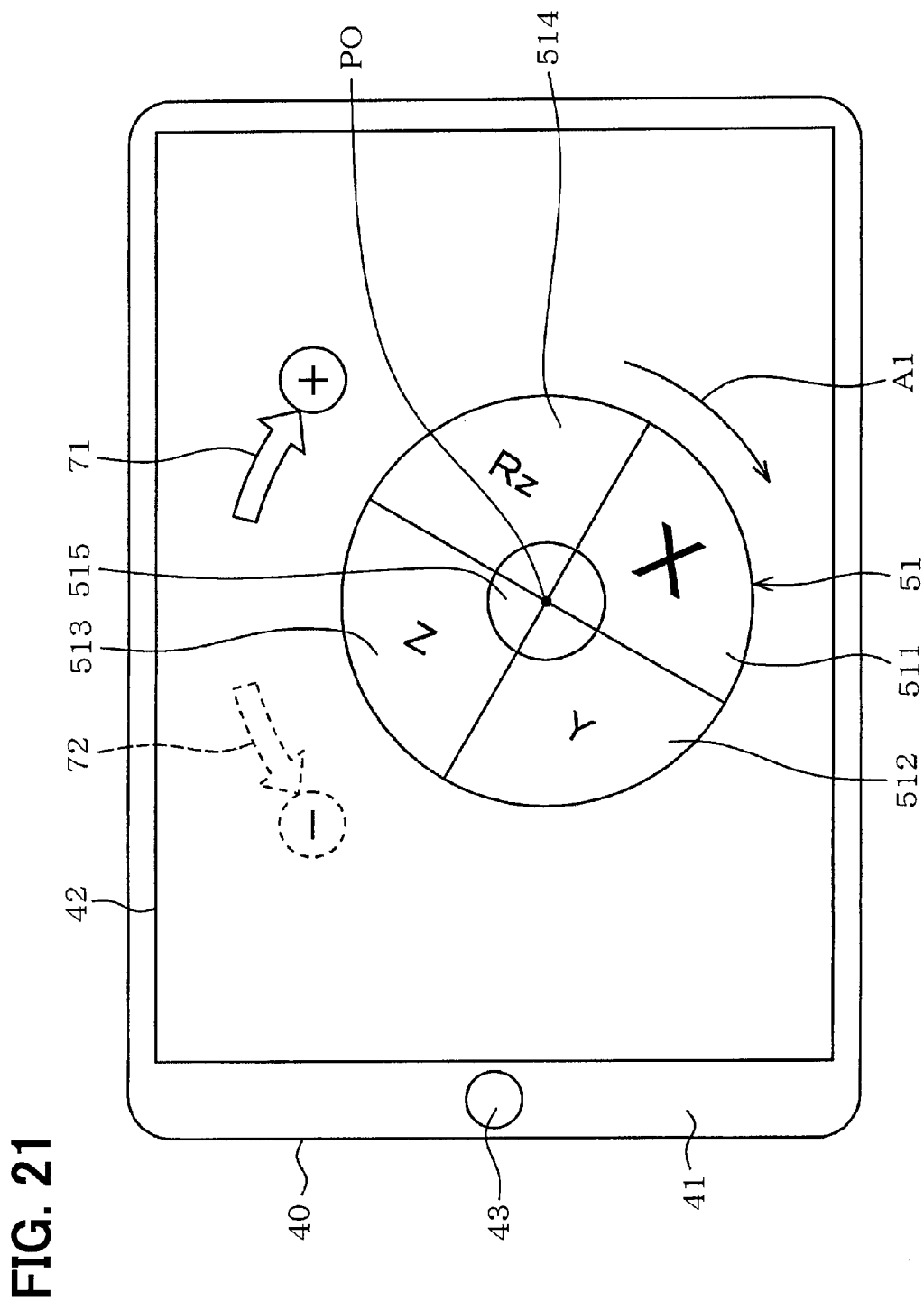
FIG. 21 is a diagram showing an example of an operation graphic displayed on the touch panel display after an end of movement operation in the positive direction input to the operation graphic according to a fourth embodiment.

A fourth embodiment will hereinafter be described with reference to FIG. 4, FIG. 10, FIG. 11, and FIG. 21 to FIG. 26. Unlike the embodiments described above where drag operation is mainly performed as movement operation, flick operation is mainly performed as movement operation in this embodiment. In this embodiment, the user inputs flick operation to the operation graphic 51 and others as main operation as illustrated in FIG. 10, FIG. 11, and FIG. 21, for example. When the user performs flick operation in the rightward rotation direction, that is, in the positive direction for the operation graphic 51 as illustrated in FIG. 10, the operation graphic 51 rotates in the rightward direction, that is, positive direction as indicated by an arrow A1 in FIG. 11.

In this embodiment, the operation graphic 51 continues rotation in the direction of the arrow A1 as if rotating with inertia even after an end of input of flick operation with separation of the finger 90 of the user or the like from the touch panel display 42 as illustrated in FIG. 21. In this case, the robots 20 and 30 also continue rotation along with the rotation of the operation graphic 51. When flick operation is further input to the rotating operation graphic 51, the rotation of the operation graphic 51 further continues. Accordingly, the motion of the robots 20 and 30 further continues. In this case, however, drag operation may be input instead of flick operation. Methods for determining behavior modes and behavior directions, and a method for calculating operation speeds of flick operation are similar to the methods of drag operation described in the foregoing embodiments.

This embodiment is similar to the first embodiment described above in the control contents from S11 in FIG. 4 to S21 in FIG. 5, and different from the first embodiment in control contents after 21 in FIG. 5. Specifically, the controller 45 of the teaching pendant 40 executes control contents illustrated in FIG. 4 and FIG. 22 to FIG. 24 in response to a start of manual operation of the robots 20 and 30. In this case, "drag operation" in FIG. 4 may be replaced with "movement operation" or "flick operation".

Figure 22:
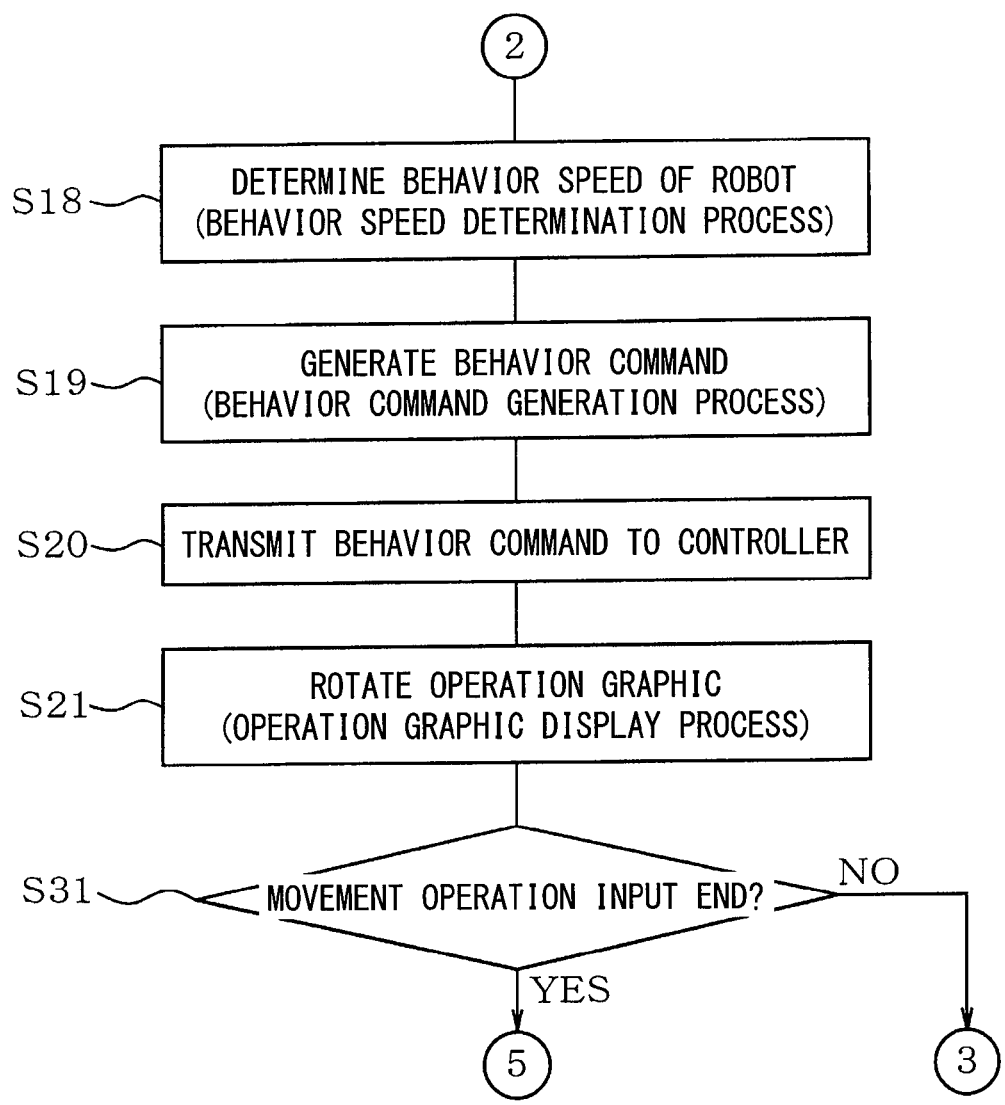
FIG. 22 is a flowchart showing example contents of processes performed by the controller according to the fourth embodiment.

Specifically, the controller 45 executes S11 in FIG. 4 to S21 in FIG. 22 when a process associated with manual operation starts. As a result, motion of the robots 20 and 30 starts in response to rotation of the operation graphic 51 based on flick operation by the finger 90 of the user or the like as illustrated in FIG. 10 and FIG. 11, for example, similarly to the first embodiment. In S21 in FIG. 22, the operation graphic rotates in accordance with the present position of the movement operation or the behavior speed of the robots.

In S31 in FIG. 22, the controller 45 determines whether or not input of the movement operation has ended. The controller 45 determines that input of the movement operation has ended based on detection that the finger 90 of the user or the like is separated from the touch panel display 42 after detection of the movement operation. When input of the movement operation is continuing (NO in S31), the controller 45 shifts to S14 in FIG. 4, and repeats S14 to S31. When input of the movement operation is ended (YES in S31), the controller 45 executes S32 in FIG. 23.

In S32, the controller 45 determines whether or not touch operation has been performed for the operation graphic 51 or the like for a predetermined period or longer. The predetermined period in S32 is referred to as a touch operation detection period when distinction between the predetermined period in S32 and a predetermined period in other steps is needed. The touch operation corresponding to a detection target in S32 is operation corresponding to a trigger for performing a stop process in S37 in FIG. 24. Accordingly, the controller 45 is required to clearly distinguish the touch operation corresponding to the trigger for the stop process from touch operation always input at the time of movement operation. In this case, the touch operation for the stop process includes an intention of the user for "stopping the robots 20 and 30", and therefore is estimated as a longer-period operation than the touch operation performed at the time of the movement operation. Accordingly, the controller 45 distinguishes between the touch operation executed for the stop process and the touch operation always input at the time of movement operation based on the input period of the touch operation, that is, whether or not the touch operation has continued for a predetermined period or longer. In this case, the predetermined period is set to approximately 500 ms, for example.

When touch operation for the predetermined period or longer is not input to the operation graphic 51 or the like (NO in S32), the controller 45 shifts to S33. In S33, the controller 45 determines whether or not a predetermined period, such as 1 sec. to 2 sec. has elapsed after determination of an end of input of the movement operation in S31 in FIG. 22. The predetermined period in S33 is referred to as a speed maintaining period when distinction between the predetermined period in S33 and a predetermined period in other steps is needed.

When it is determined that the predetermined period has not elapsed yet after the end of input of the movement operation (NO in S33), the controller 45 executes the speed mainlining process in S34. The speed maintenance process is a process for maintaining the behavior speed Vr of the robots 20 and 30 at the behavior speed Vr of the robots 20 and 30 immediately before the end of input of the movement operation in S31 in FIG. 22 for a predetermined period from the end of input of the movement operation until a start of a speed reduction process in S35 in FIG. 23. In other words, the robots 20 and 30 operate at the constant behavior speed Vr for the predetermined period after the end of input of the movement operation. After completion of the speed maintenance process, the controller 45 shifts to S14 in FIG. 4, and repeats the processes after S14.

When it is determined that the predetermined period has elapsed after the end of input of the movement operation (YES in S33 in FIG. 23), the controller 45 shifts to S35 to execute the speed reduction process. Specifically, after an elapse of the predetermined period from the end of input of the movement operation without input of a subsequent movement operation, that is, after continuation of the speed maintenance process for a predetermined period, the controller 45 executes the speed reduction process in S35. The speed reduction process is a process for gradually reducing the behavior speed Vr of the robots 20 and 30 in a period not receiving input of the subsequent movement operation after the end of input of the movement operation. In this embodiment, the controller 45 executes the speed reduction process after execution of the speed maintenance process, that is, after an elapse of the predetermined period in S33. After completion of the speed reduction process, the controller 45 shifts to S14 in FIG. 4, and repeats the processes after S14.

The "gradual reduction of the behavior speed Vr of the robots 20 and 30" in this context refers to reduction of the speed at a rate substantially equivalent to a reduction rate of the rotation speed from the time of no input of operation to the operation graphic 51 to a rotation stop of the operation graphic 51 on the assumption that the operation graphic 51 is a disk having substance whose rotation receives inertial force and friction force, for example. Accordingly, the degree of speed reduction of "gradual speed reduction" is variable in accordance with the behavior speed Vr of the robots 20 and 30 immediately before the end of input of the movement operation.

Figure 23:
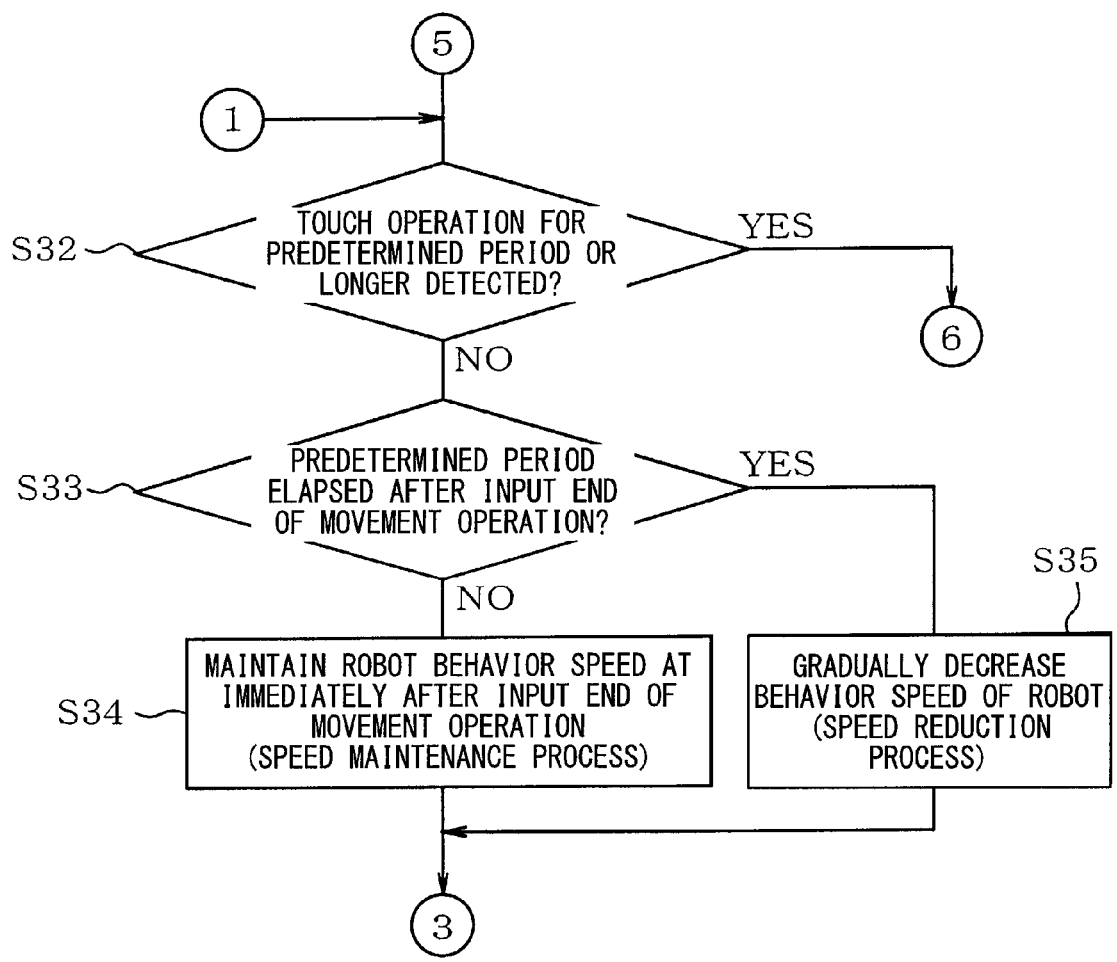
FIG. 23 is a flowchart showing example contents of processes performed by the controller according to the fourth embodiment.
Figure 24:
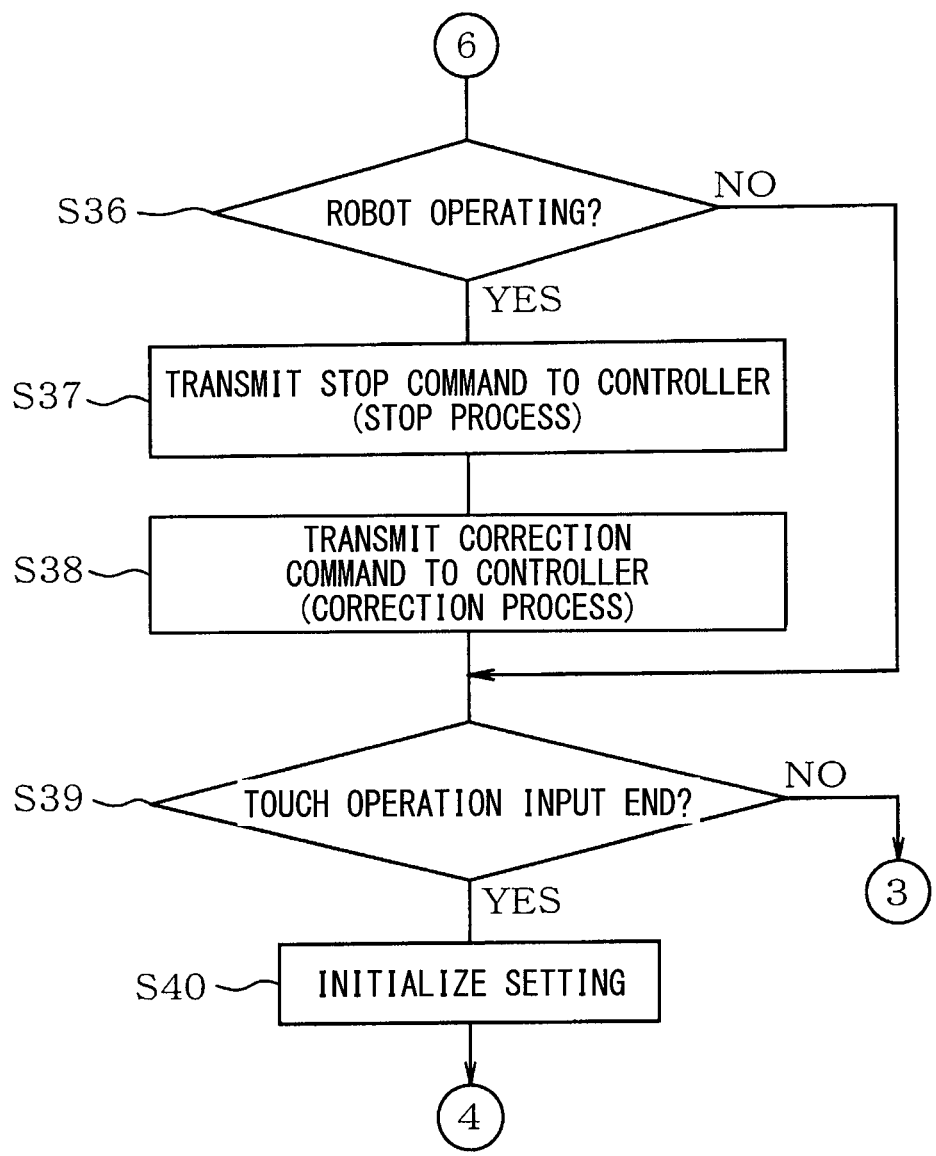
FIG. 24 is a flowchart showing example contents of processes performed by the controller according to the fourth embodiment.

When touch operation for the predetermined period or longer is input to the operation graphic 51 in S32 in FIG. 23 (YES), the controller 45 shifts to S36 in FIG. 24. In S36, the controller 45 determines whether or not the robots 20 and 30 are operating, that is, whether or not the robots 20 and 30 have stopped. When it is determined that the robots 20 and 30 have stopped (NO in S36), the controller 45 shifts to S39 while skipping processes in S37 and S38. When the robots 20 and 30 are operating (YES in S36), the controller 45 executes S37 and S38.

In S37, the controller 45 executes a stop process. The stop process is a process for stopping motion of the robots 20 and 30. The controller 45 transmits a stop command to the controller 11. A certain time is required from execution of the stop process until an actual stop of the robots 20 and 30. In this case, the robots 20 and 30 may shift to a position exceeding a stop position intended by the user. For avoiding this problem, the controller 45 executes a correction process in S38. The correction process is a process for shifting the robots 20 and 30 to the positions at which touch operation is performed for the stop process after the robots 20 and 30 shift from these positions. Specifically, the correction process is a process for returning the robots 20 and 30 to the stop positions intended by the user when the robots 20 and 30 shift in excess of the stop positions intended by the user.

Thereafter, the controller 45 shifts to S39 to determine whether or not input of the touch operation detected in S32 has been ended. When it is determined that input of the touch operation has not been ended (NO in S39), the controller 45 shifts to S14 in FIG. 4 to repeat the processes after S14. When it is determined that input of the touch operation has been ended (YES in S39), the controller 45 executes S40 to cancel, that is, initialize current settings of the behavior mode and the behavior direction of the robots 20 and 30. As a result, a series of processes are completed, and the motion of the robots 20 and 30 ends. Thereafter, the controller 45 returns to S11 in FIG. 4 to again perform the processes after S11. The user is therefore allowed to execute manual operation in a new behavior mode and a new behavior direction. In other words, the user is allowed to change the behavior mode and the behavior direction of the robots 20 and 30.

Figure 25:
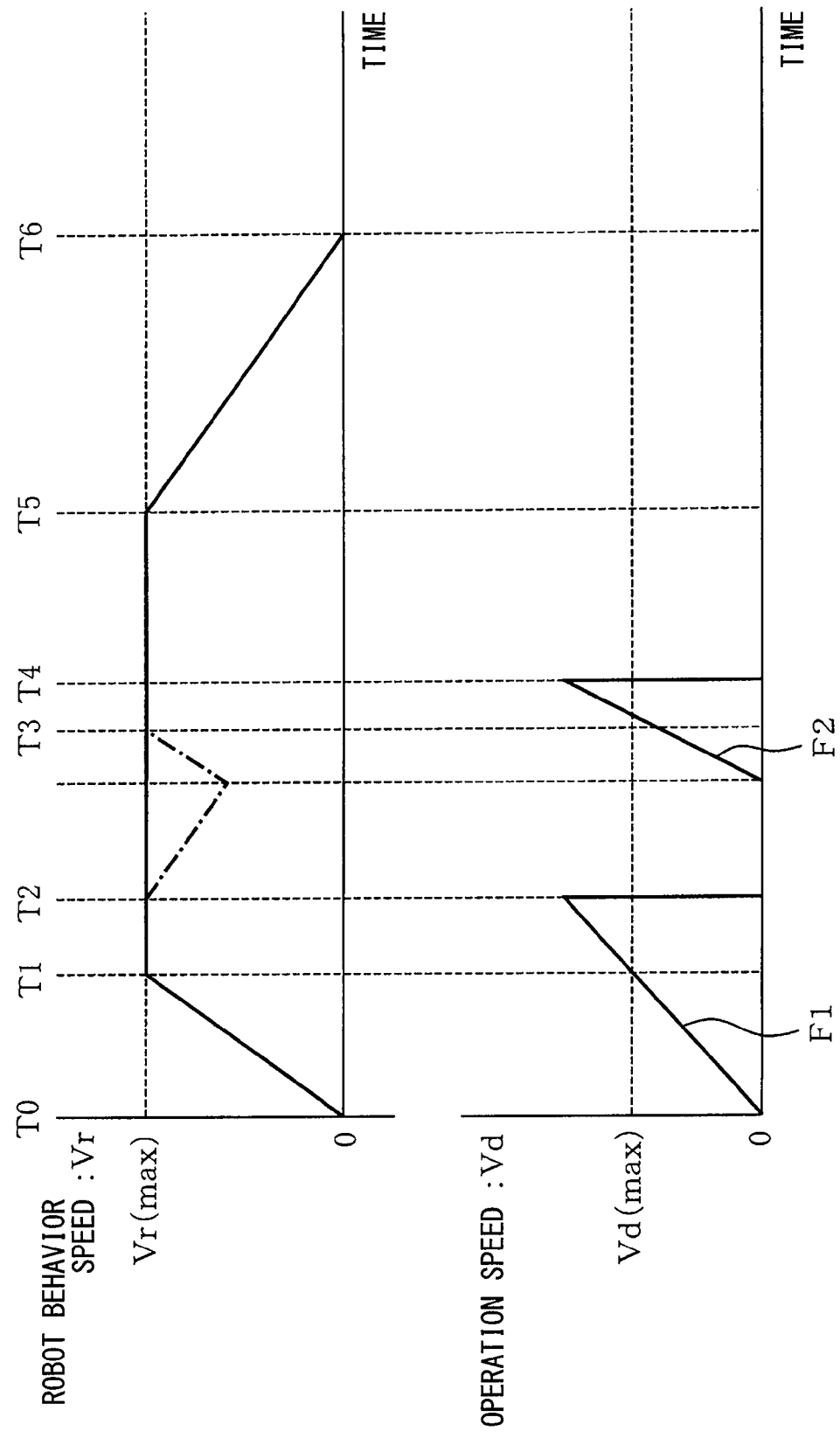
FIG. 25 is a diagram showing a relation between the operation speed of movement operation and the behavior speed of the robot according to the fourth embodiment.
Figure 26:
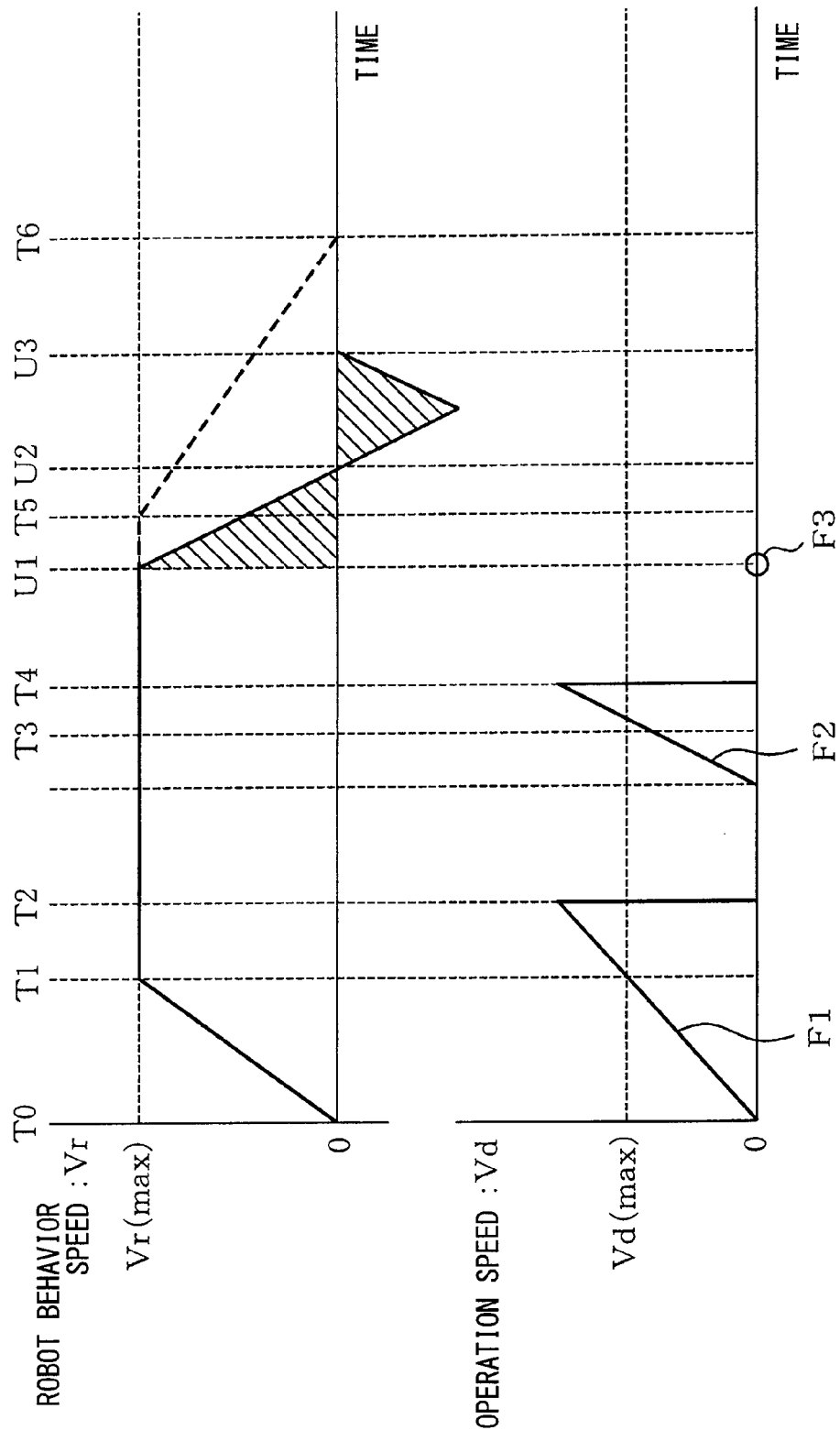
FIG. 26 is a diagram showing the relation between the operation speed of movement operation and the behavior speed of the robot according to the fourth embodiment.

The relation between the operation speed Vd of movement operation and the behavior speed Vr of the robots 20 and 30 will hereinafter be described with reference to FIG. 25 and FIG. 26. In FIG. 25 and FIG. 26, Vd(max) and Vr(max) have a relation to each other. In this case, Vr(max) is the maximum speed of the robots 20 and 30, and Vd(max) is the operation speed Vd required for setting the maximum speed of the robots 20 and 30.

A case of continuous input of two movement operations F1 and F2 as illustrated in FIG. 25 and FIG. 26 is considered herein. When the previous movement operation F1 is input, the behavior speed Vr of the robots 20 and 30 increases with increase in the operation speed Vd of the movement operation F1 as indicated in a period T0 to T1. When the behavior speed Vr of the robots 20 and 30 reaches the Vr(max), the behavior speed Vr of the robots 20 and 30 is maintained at Vr(max) even in a state that the operation speed Vd of the movement operation F1 exceeds Vd(max) as indicated in a period T1 to T2.

After an end of input the previous movement operation F1, a speed maintenance process is performed as indicated in a period T2 to T3. The period T2 to T3 is a speed maintaining period. As a result, the behavior speed Vr of the robots 20 and 30 is maintained at the behavior speed Vr immediately before the end of input of the previous movement operation F1, that is, Vr(max) in this example, even when no movement operation is input. When the subsequent movement operation F2 is input before an elapse of the speed maintaining period T2 to T3, the operation speed Vd of the robots 20 and 30 is determined based on the operation speed Vd of the movement operation F2. When a speed maintaining period indicated in a period T4 to T5 elapses without further input of movement operation after the end of input of the movement operation F2, the behavior speed Vr of the robots 20 and 30 gradually decreases by the speed reduction process as indicated in a period T5 to T6, and finally comes to a stop. In this case, the period T5 to T6 is a speed reduction period.

When touch operation F3 for a predetermined period or longer is input within the period T4 to T5 which is a speed maintaining period as indicated in a period U1 to U2 in FIG. 26, the stop process is executed to stop the robots 20 and 30. In this case, the period U1 to U2 is a stop period. The speed reduction rate of the behavior speed Vr during the stop period U1 to U2 is higher than the speed reduction rate of the behavior speed Vr during the speed reduction period T5 to T6. Thereafter, the correction process is performed subsequently to the stop process as indicated in a period U2 to U3. In this case, the period U2 to U3 is a correction period. The area of a shaded portion in the stop period U1 to U2 is equivalent to the area of a shaded portion in the correction period U2 to U3. Specifically, a shift amount of the robots 20 and 30 during the stop period U1 to U2 is equivalent to a shift amount of the robots 20 and 30 during the correction period U2 to U3. Accordingly, the positions of the robots 20 and 30, that is, the fingertip positions of the robots 20 and 30 are returned to the positions at which input of the touch operation F3 is performed.

In this embodiment, therefore, a behavior speed V of the robots 20 and 30 gradually decreases after an end of input of flick operation, for example. In this case, the robots 20 and 30 continue motion for a certain period after the end of input of the flick operation without a sudden stop immediately after the end of input of the flick operation. Accordingly, the user is capable of continuing motion of the robots 20 and 30 without completely stopping the robots 20 and 30 by repeating quick flick operation, for example. This structure effectively utilizes a limited area on the touch panel display 42. In other words, the area required for movement operation on the touch panel display 42 is allowed to decrease, and thus size reduction of the teaching pendant 40 is achievable. Moreover, the user is capable of reducing a shift amount of the finger 90 or the like at the time of movement operation by performing quick flick operation for motion of the robots 20 and 30, for example. As a result, operability improves with a reduced burden on the user.

When the foregoing speed reduction process is initiated immediately after an end of input of movement operation, the following problems occur in case of input of multiple movement operations. In this situation, the behavior speed Vr of the robots 20 and 30 decreases in accordance with the speed reduction process within a period from the end of input of the previous movement operation F1 until the subsequent movement operation F2 as in the period T2 to T3 indicated by a long dashed short dashed line in FIG. 25. In this case, the behavior speed Vr of the robots 20 and 30 is easily variable, and thus motion of the robots 20 and 30 easily becomes unstable.

In this embodiment, the user inputs subsequent operation within a predetermined period of the speed maintenance process to avoid speed reduction of the robots 20 and 30 before input of the subsequent movement operation as a result of the speed reduction process. In this case, variations of the behavior speed Vr of the robots 20 and 30 decrease even in the case of continuous flick operation, for example, and thus stability of the behavior speed of the robots 20 and 30 improves. Moreover, this structure easily maintains the constant behavior speed Vr of the robots 20 and 30 even when intervals of flick operation are relatively long. Accordingly, the number of times of flick operation is allowed to decrease, and thus a burden on the user decreases. After performance of the speed maintenance process for the predetermined period, the speed reduction process discussed above is performed. In this case, the speed of the robots 20 and 30 decreases to a stop after an elapse of a predetermined period from the end of movement operation. Accordingly, safety improves.

In this embodiment, the user is capable of stopping motion of the robots 20 and 30 without the necessity of waiting for a stop produced by the speed reduction process when the user inputs the touch operation F3 to the operation graphic 51 or the like for a predetermined period or longer even during motion of the robots 20 and 30 in the speed reduction process or the speed maintenance process as illustrated in FIG. 26, for example. In this structure, the user is capable of stopping motion of the robots 20 and 30 at arbitrary timing. Accordingly, safety and operability further improve.

In this embodiment, the correction process allows the fingertip positions of the robots 20 and 30 to return to the positions of the robots 20 and 30 which are at the time of the touch operation F3 even when the robots 20 and 30 shift from the positions at the time of the touch operation F3 as indicated in the period U1 to U2 in FIG. 26. Accordingly, deviation between the stop positions of the robots 20 and 30 intended by the user and the actual stop positions in the robots 20 and 30 is correctable. As a result, operability improves.

Fifth Embodiment

A fifth embodiment will hereinafter be described with reference to FIG. 27. In this embodiment, the behavior command generator 47 maintains the behavior speed Vr of the robots 20 and 30 at the value based on the operation speed Vd of previous movement operation when the operation speed Vd of subsequent operation input during the speed maintenance process performed based on the previous movement operation falls within a predetermined range RA for the operation speed Vd of the previous movement operation. When the operation speed Vd of the subsequent movement operation falls out of the predetermined range RA for the operation speed Vd of the previous movement operation, the behavior command generator 47 determines the behavior speed Vr of the robots 20 and 30 based on the operation speed Vd of the subsequent operation. In this case, the predetermined range RA is determined on the basis of an average value or a maximum value of the operation speed Vd of the previous operation, such as a range of several percent higher or lower than the average speed of the operation speed Vd of the previous movement operation.

Figure 27:
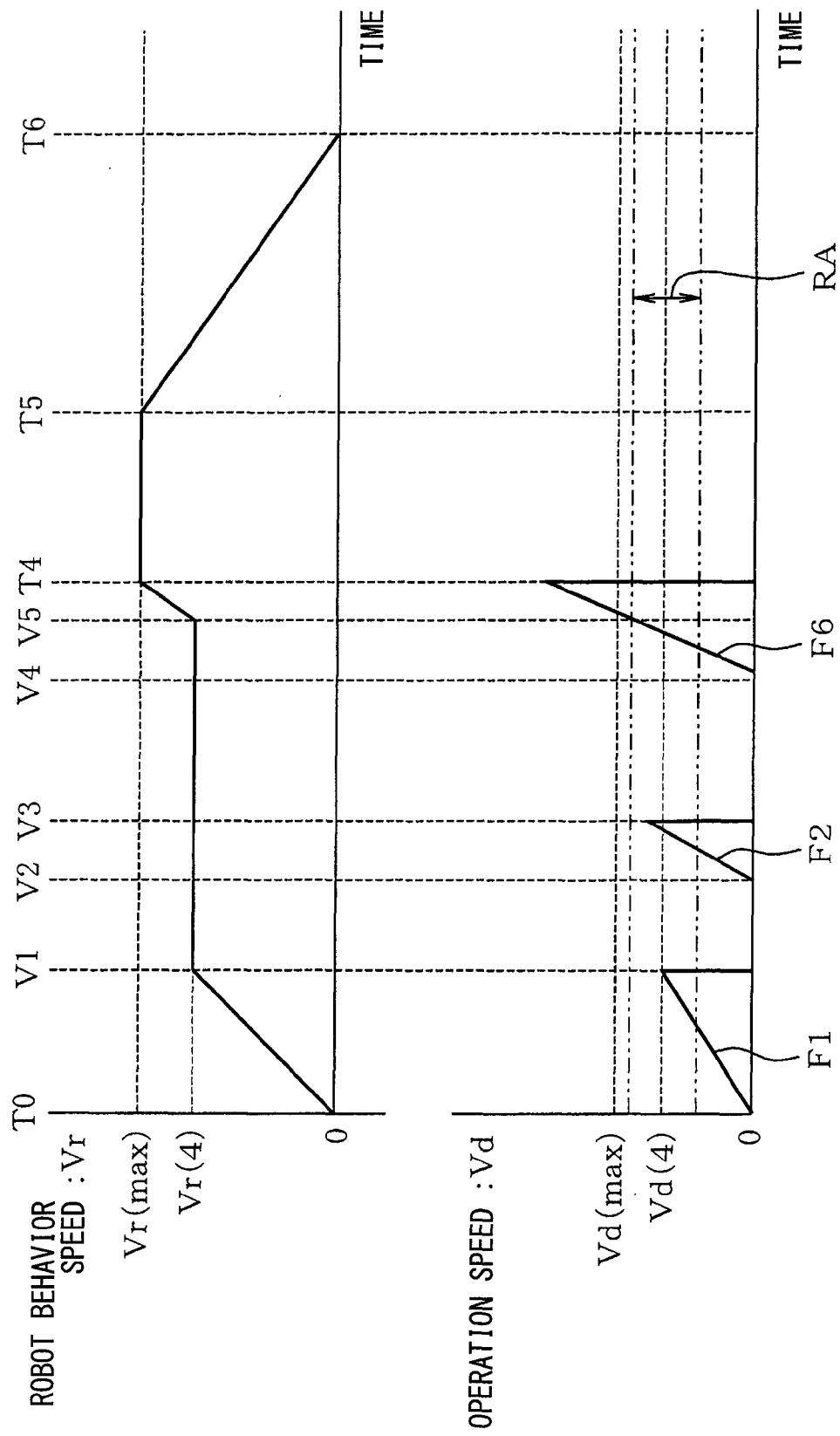
FIG. 27 is a diagram showing a relation between the operation speed of movement operation and the behavior speed of the robot according to a fifth embodiment.

FIG. 27 illustrates a case of input of three flick operations F4 to F6. In this case, the controller 45 having detected the initial flick operation F4 operates the robots 20 and 30 at the behavior speed Vr responsive to the operation speed Vd of the flick operation F4, and establishes the predetermined range RA on the basis of the operation speed Vd of the flick operation F4 as indicated in a period T0 to V1. In FIG. 27, the predetermined range RA on the basis of a maximum value Vd (4) of the operation speed Vd of the initial flick operation F4 is indicated by a long dashed double-short dashed line. After an end of input of the flick operation F4, the behavior speed Vr (4) immediately before the end of input of the flick operation F4 is maintained as indicated in a period V1 to V2.

When detecting the subsequent flick operation F5, the controller 45 determines whether or not the operation speed Vd of the flick operation F5 falls within the predetermined range RA on the basis of the previous flick operation F4. In this example, the operation speed Vd of the subsequent flick operation F5 falls within the predetermined range RA on the basis of the maximum value Vd (4) of the operation speed Vd of the previous flick operation F4. Accordingly, the controller 45 continues motion of the robots 20 and 30 at the behavior speed Vd (4) while maintaining the behavior speed Vd (4) of the robots 20 and 30 at the time of the end of input of the previous movement operation F4 as indicated in a period V2 to V4.

Similarly, the controller 45 having detected the subsequent flick operation F5 determines whether or not the operation speed Vd of the flick operation F6 falls within the predetermined range RA in the basis of the previous flick operation F4. In this example, the operation speed Vd of the subsequent flick operation F6 falls out of the predetermined range RA based on the operation speed Vd of the previous flick operation F4. Accordingly, the controller 45 operates the robots 20 and 30 at the behavior speed Vr responsive to the operation speed Vd of the flick operation F6, and re-establishes the predetermined range RA based on the operation speed Vd of the flick operation F6 as indicated in a period V5 to T4.

In this structure, the constant operation speed Vd of the robots 20 and 30 is maintained even in a state of certain variations of the operation speed Vd of each of the flick operations F4 to F6 when the operation speed Vd falls within the predetermined range RA. This structure therefore absorbs variations of the operation speed Vd of the movement operations F4 to F6, thereby improving stability of the motion of the robots 20 and 30. Moreover, the user is capable of changing the behavior speed Vr of the robots 20 and 30 by inputting movement operation having the operation speed Vd out of the predetermined range RA, such as the subsequent flick operation F6 for the previous flick operation F4. Accordingly, this structure allows flexible operation while absorbing variations of the operation speed Vd of the movement operations F4 to F6. As a result, operability improves.

Other Embodiments

Embodiments according to the present disclosure are not limited to the embodiments described and depicted in the graphics herein, but may be modified as appropriate without departing from the scope of the subject matters of the disclosure. The embodiments according to the present disclosure may be modified or extended in the following manners.

For example, the angle directions corresponding to the selection areas 541 to 552 in the third embodiment are not limited to the angle directions described herein, but may be arbitrarily determined by the user. For example, the behavior modes allocated to the selection areas 541 to 552 are not limited to the modes in the X-Y plane direction, but may be modes allocated to areas in the X-Z plane or the Y-Z plane, or other behavior modes. In addition, the number of the selection areas may be arbitrarily increased or decreased by the user.

In the embodiments described herein, the touch panel 421 and the display 422 are integrally formed into the touch panel display 42. However, the touch panel and the display may be separate individual units. In this case, the operation graphics and direction graphics may be formed on the touch panel in advance by printing or other methods.

The robot which is the operation target of the teaching pendant 40 according to the embodiments described herein is not limited to the four-axis robot 20 or the six-axis robot 30. For example, the four-axis robot 20 or the six-axis robot 30 may be provided on a so-called X-Y stage (two-axis stage). The robot which is the operation target of the teaching pendant 40 includes a linear type robot having one driving axis, and an orthogonal type robot having multiple driving axes, for example. The driving axes of these structures are not limited to mechanical rotation axes, but may be constituted by a system driven by a linear motor.

Figure 28:
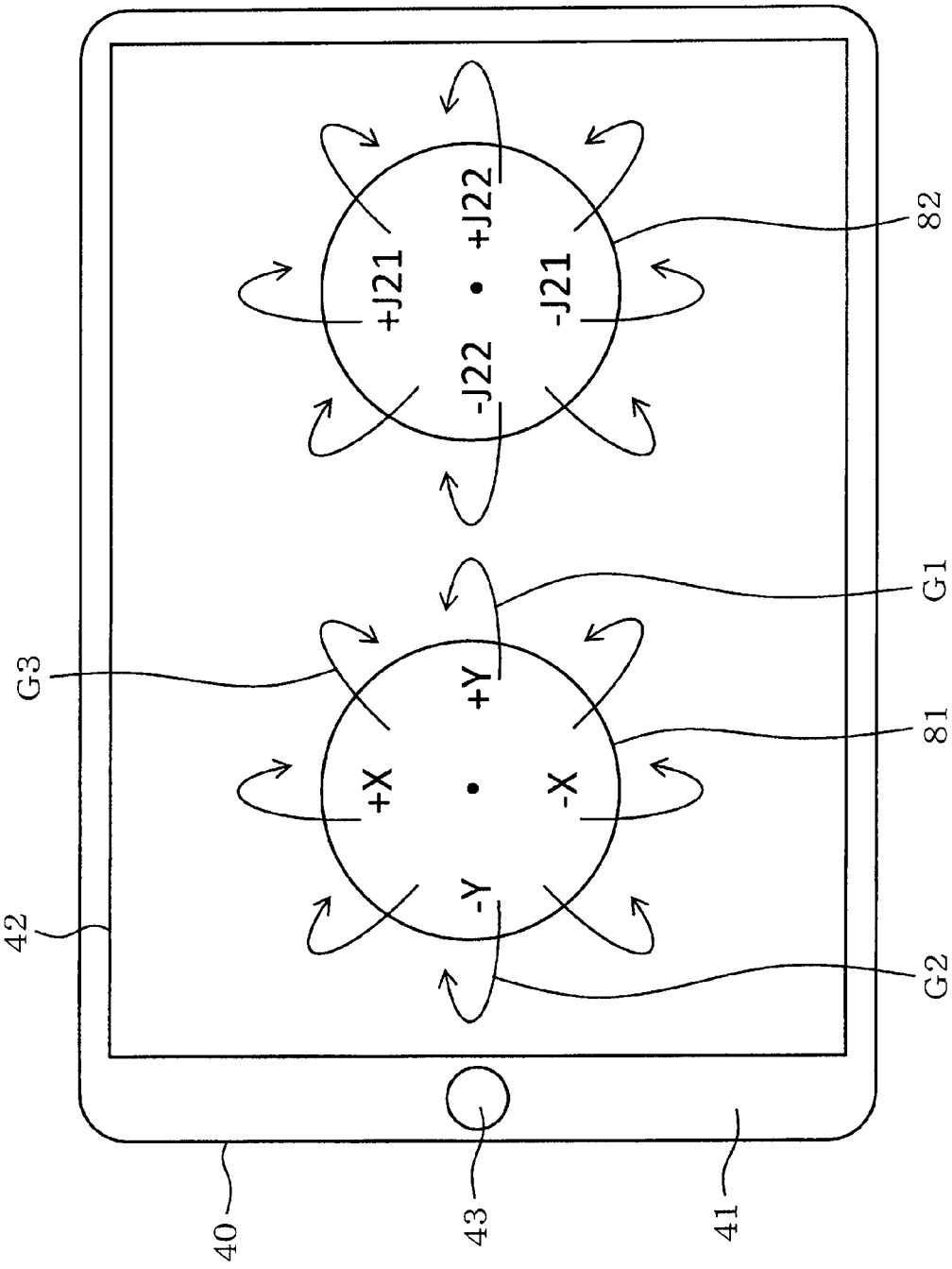
FIG. 28 is a diagram showing an example of an operation graphic displayed on the touch panel display when manual operation of the fingertip system of the robot is performed according to another embodiment.

The operation graphic 51 and the like may have virtual three-dimensional shapes instead of planar configurations. For example, each of operation graphics 81 and 82 illustrated in FIG. 28 is a virtual sphere displayed on the display 422, and having a configuration of a so-called virtual trackball. The user is capable of virtually rotating the operation graphics 81 and 82 in an operation direction of movement operation by inputting movement operation in an arbitrary direction indicated by each arrow to the operation graphics 81 and 82, for example. In this case, the user is capable of shifting the fingertips of the robots 20 and 30 in the +Y direction by rotating the operation graphic 81 in a direction indicated by an arrow G1, for example. Similarly, the user is capable of shifting the fingertips of the robots 20 and 30 in the −Y direction by rotating the operation graphic 81 in a direction indicated by an arrow G2.

Furthermore, the user is capable of moving the fingertips of the robots 20 and 30 in a direction synthesizing the +X direction and the +Y direction by rotating the operation graphic 81 in a direction indicated by an arrow G3, for example. In this structure, operability does not easily deteriorate even when the size of the operation graphic decreases. Accordingly, size reduction of the teaching pendant 40 is achievable without deteriorating operability. In this case, three or more operation graphics may be provided on the touch panel display 42. The structure illustrated in FIG. 28 is applicable to any operation of the fingertip system or any operation of the axis system.

The four-axis type horizontally articulated robot 20 is an example of a robot. The six-axis type vertically articulated robot 30 is an example of the robot. The teaching pendant 40 is an example of a robot operation apparatus. The four-axis fingertip system operation graphic 51 is an example of an operation graphic.

As described above, a robot operation apparatus and a robot operation program product in various modes are provided according to the present disclosure.

For example, a robot operation apparatus according to an aspect of the present disclosure includes: a touch panel that receives input of touch operation and movement operation from a user; an operation detector capable of detecting the touch operation and the movement operation to the touch panel; and a behavior command generator that generates a behavior command for operating a robot based on a detection result received from the operation detector. In other words, the robot operation apparatus realizes manual operation of the robot by touch operation and movement operation.

The touch operation in this context refers to an operation for contacting, or touching the touch panel by using a finger of a user, a pen device or the like (hereinafter referred to as finger or the like). The movement operation refers to drag operation or flick operation contained in various types of operation performed by the finger of the user or the like. In this case, the drag operation refers to an operation continuously performed after touch operation by shifting the finger of the user or the like along the touch panel in a state of contact with the touch panel. The flick operation refers to an operation continuously performed after touch operation by shifting the finger of the user in a manner tapping the touch panel. Accordingly, both the drag operation and the flick operation are operations for continuously shifting the finger of the user or the like for a certain distance in a state of contact with the touch panel. Distinction between the drag operation and the flick operation is made based on a shift distance and a shift period.

According to the robot operation apparatus, the behavior command generator may perform a behavior speed determination process. The behavior speed determination process is a process for determining a behavior speed of the robot based on an operation speed of movement operation when the operation detector detects the movement operation in the rotation circumferential direction of the operation graphic defined on the touch panel. The movement operation to the operation graphic in this context includes drag operation in the rotation circumferential direction of the operation graphic, for example. The rotation circumferential direction of the operation graphic refers to a circumferential direction of a circle drawn by a locus of an arbitrary point contained in the operation graphic and disposed at a position different from a rotation center on the assumption that the operation graphic is virtually rotated around the rotation center disposed at an arbitrary point in the operation graphic.

In this structure, the behavior speed of the robot is determined based on the operation speed of the movement operation to the operation graphic defined on the touch panel. In this case, the robot behavior speed is determined based on the operation speed of the movement operation when the movement operation in the rotation circumferential direction of the operation graphic, that is, drag operation or flick operation is performed, for example. Accordingly, the user is capable of continuing motion of the robot at the moving speed of the movement operation, that is, the moving speed responsive to the behavior speed by performing movement operation in such a manner as to draw a circle for the operation graphic defined on the touch panel. When the user continues movement operation in such a manner as to draw a circle at a high speed in the rotation circumferential direction of the operation graphic, for example, the robot continues motion at a high behavior speed responsive to the high operation speed. When the user continues movement operation in such a manner as to draw a circle at a low behavior speed in the rotation circumferential direction of the operation graphic, for example, the robot continues motion at a low behavior speed responsive to the low operation speed. The robot stops in response to a stop of movement operation by the user.

Accordingly, the robot operation apparatus of the present disclosure continues motion of the robot in accordance with continuation of movement of the finger of the user or the like in a manner drawing a circle, and stops the robot in accordance with a stop of the finger of the user or the like. In this case, the behavior speed of the robot is controllable by the user in accordance with control of the shift speed of the finger of the user or the like. Accordingly, the user easily obtains such an impression that movement operation by the user, that is, movement of the finger of the user or the like produced by drag operation or flick operation by the user and the motion of the robot are associated with each other. In this condition, the user is capable of directly and intuitively determining the correlation between the movement operation performed by the user and the motion of the robot performed in accordance with the movement operation. As a result, operability for the user improves.

Moreover, according to the robot operation apparatus of the present disclosure, the user is capable of continuing motion of the robot by continuing movement operation in such a manner as to draw a circle on the touch panel. This structure allows the user to continue movement operation for operating the robot without limitation to the screen size of the touch panel. In this case, an unintended stop of motion of the robot as a result of discontinuation of drag operation caused by limitation to the screen size of the touch panel is avoidable, for example. Accordingly, operability improves. In addition, according to the structure which allows continuation of movement operation for operating the robot without limitation to the screen size of the touch panel, size reduction of the touch panel is achievable.

According to the robot operation apparatus of the present disclosure, the behavior command generator may perform an operation direction determination process. The operation direction determination process sets the behavior direction of the robot to the positive direction when the operation direction of movement operation is the positive direction for the rotation circumference direction of the operation graphic, or sets the behavior direction of the robot to the negative direction when the operation direction of movement operation is the negative direction for the rotation circumference direction of the operation graphic. In this structure, the behavior direction of the robot is determined based on the operation direction of movement operation for the rotation circumferential direction of the operation graphic.

In this case, the operation direction of movement operation in the rotation circumferential direction of the operation graphic is either the positive or negative direction for the rotation circumferential direction of the operation graphic. This structure determines the positive or negative direction of the behavior direction of the robot when the user performs movement operation in the rotation circumferential direction of the operation graphic. Accordingly, the user is capable of performing both operation for determining the behavior direction of the robot, and operation for determining the behavior speed of the robot by a series of movement operation without the necessity of additional operation for determining the behavior direction of the robot. As a result, operability improves with reduced labor.

In the robot operation apparatus of the present disclosure, the operation graphic may include multiple selection areas. The selection areas are areas to which the behavior modes of the robot constituted by driving axes or a combination of driving axes of the robot are allocated. The behavior command generator may perform a behavior mode determination process. The behavior mode determination process is a process for setting the behavior mode of the robot to the behavior mode allocated to the touched selection area when the operation detector detects touch operation for touching any one of the selection areas.

In this structure, the user is capable of selecting the behavior mode of the robot by touching any one of the selection areas of the operation graphic. Specifically, in case of movement operation, that is, drag operation or flick operation for determining the behavior speed of the robot, touch operation for touching the touch panel is always performed before the drag operation or flick operation. According to the robot operation apparatus of the present disclosure, the user is capable of selecting the behavior mode of the robot by touch operation always performed for determining the behavior speed of the robot. Accordingly, the necessity of operation for selecting the behavior mode of the robot is eliminated, and therefore operability improves with a reduced number of operations.

The robot operation apparatus according to the present disclosure may further include a display capable of displaying a graphic, and a display controller that controls display contents on the display. The display controller may perform an operation graphic display process. The operation graphic display process is a process for displaying the operation graphic on the display. In this structure, the user is capable of easily determining the direction of movement operation, for example, while performing movement operation with reference to the operation graphic displayed on the display. As a result, operability further improves.

According to the robot operation apparatus of the present disclosure, the operation graphic display process may include a process for rotating the operation graphic in accordance with a shift of a present position of movement operation, and displaying the rotated operation graphic on the display. In this structure, the user is capable of easily and visually checking whether or not the user is appropriately performing movement operation, for example, while viewing the operation graphic rotating in accordance with the movement operation by the user. As a result, more intuitive operation is achievable, and therefore the user obtains more preferable operational feeling.

According to the robot operation apparatus of the present disclosure, the behavior speed determination process may be a process for determining the behavior speed of the robot based on an angular speed of movement operation with respect to the rotation center defined in the operation graphic. Specifically, in case of movement operation in a manner drawing a circle around a certain center point, the rotation angle with respect to the shift distance of the movement operation in the circumferential direction decreases as an operation position associated with the movement operation comes farther from the center point, that is, as the radius of a circle or a circular arc drawn by the movement operation becomes larger. In other words, a change of the angular speed of the movement operation, which changes in accordance with increase and decrease in the speed of the movement operation in the circumferential direction with respect to the rotation center, that is, increase and decrease in a circumferential speed, decreases as the radius of the circle or circular arc drawn by the movement operation increases.

For example, in case of movement operation by the user for drawing a circle having a large radius, the rotation angle decreases even when the shift distance associated with the movement operation in the circumferential direction is long. In other words, the user obtains a slow angular speed at a high circumferential speed by performing movement operation for drawing a circle or circular arc having a large radius. This condition is advantageous at the time of fine adjustment, that is, fine movement of a fingertip position of the robot. In this case, the user is capable of further decreasing a change of the behavior speed of the robot changeable in accordance with increase and decrease in the shift speed of movement operation. Specifically, when the circumferential speed of movement operation is constant, the user is capable of operating the robot at a lower behavior speed by performing movement operation in a manner drawing a circle or circular arc having a large radius, in comparison with the behavior speed of movement operation in a manner drawing a circle having a small radius.

In case of movement operation by the user for drawing a circle or circular arc having a small radius, the rotation angle increases even when the shift distance associated with the movement operation in the circumferential direction is short. In other words, the user is capable of obtaining a high angular speed at a slow circumferential speed by performing movement operation for drawing a circle or circular arc having a small radius. This condition is advantageous at the time of a large shift, that is, rough movement of the fingertip position of the robot. In this case, the user is capable of further increasing a change of the behavior speed of the robot changeable in accordance with increase and decrease in the shift speed of movement operation. Specifically, when the circumferential speed of drag operation is constant, the user is capable of operating the robot at a higher behavior speed by performing drag operation in a manner drawing a circle having a small radius, in comparison with the behavior speed of drag operation in a manner drawing a circle having a large radius.

According to this robot operation apparatus, therefore, the user is capable of controlling a change of the behavior speed of the robot changeable in accordance with increase and decease in the operation speed of movement operation in the circumferential direction by performing movement operation while controlling the distance from the rotation center in the operation graphic to the operation position of the movement operation, that is, controlling the length of the radius of a circle or circular arc drawn by the movement operation. Accordingly, the user is capable of easily switching fine movement and rough movement of the robot depending on use purposes. As a result, operability further improves.

According to the robot operation apparatus of the present disclosure, the behavior speed determination process may include a process for determining movement operation performed within an invalid area as invalid operation when the movement operation detected by the operation detector is operation input to the invalid area provided in the vicinity of the rotation center in the operation graphic. Specifically, in the foregoing structure which determines the behavior speed of the robot based on the angular speed of movement operation, a change of the behavior speed of the robot changeable with increase and decrease in the circumferential speed of movement operation increases as the operation position of the movement operation comes closer to the rotation center. Accordingly, when the operation position of movement operation is located in the vicinity of the rotation center, slight movement operation performed by the user considerably affects motion of the robot. In this case, the scale of motion of the robot may easily exceed the scale intended by the user.

According to this robot operation apparatus, however, the invalid area is defined in the vicinity of the rotation center of the operation graphic. Movement operation to the invalid area is determined as invalid. This invalid movement operation is determined as no input of movement operation, and therefore motion of the robot stops. Accordingly, when the operation position of movement operation is located in the vicinity of the rotation center, the robot is stopped for safety so as to avoid a situation that slight movement operation performed by the user considerably affects motion of the robot. This structure minimizes a problem that the scale of motion of the robot exceeds the scale intended by the user. As a result, safety improves.

According to the robot operation apparatus of the present disclosure, a behavior speed determination process may determine the behavior speed of the robot based on the circumferential speed of movement operation with respect to the rotation center defined in the operation graphic. Specifically, according to the structure which determines the behavior speed of the robot based on the angular speed of movement operation as described above, the behavior speed of the robot is determined based on the operation position and the circumferential speed of the movement operation. Accordingly, the user needs to control two values of the operation position and the circumferential speed of movement operation to determine the behavior speed of the robot. In this case, for a skilled person, simultaneous control for the two values of the operation position and the circumferential speed of movement operation is relatively easy. However, for a beginner, simultaneous control of the two values of the operation position and the circumferential speed of movement operation is relatively difficult.

For example, in a structure which determines the behavior speed of the robot based on the angular speed of movement operation, the behavior speed of the robot changes with a change of the size of a circle or circular arc drawn by the movement operation or a distance between the rotation center and the operation position of the movement operation even when the circumferential speed of the movement operation is constant. Accordingly, when the radius of the actual circle or circular arc drawn by movement operation changes, or when the center of the circle or circular arc deviates from the rotation center defined in the operation graphic, the distance between the rotation center and the operation position of the movement operation changes even in case of movement operation at a constant circumferential speed performed by the user intending to operate the robot at a constant speed. This condition varies the behavior speed of the robot, thereby easily producing motion not meeting the intention of the user for operating the robot at a constant speed.

According to this robot operation apparatus, however, the behavior speed of the robot is determined based on the circumferential speed of movement operation with respect to the rotation center defined in the operation graphic. In this case, the circumferential speed of movement operation is directly reflected on the behavior speed of the robot. This structure allows the user to perform movement operation without considering the distance between the rotation center and the operation position of the movement operation, that is, the radius of the circle or circular arc drawn by the movement operation or deviation from the rotation center. Accordingly, even a beginner can perform operation relatively easily. As a result, operability improves from a viewpoint different from the viewpoint of the foregoing structure which determines the behavior speed of the robot based on the circumferential speed of movement operation.

According to the robot operation apparatus of the present disclosure, the behavior speed determination process may include a speed reduction process. The speed reduction process is a process for gradually reducing the behavior speed of the robot in a period not receiving input of subsequent movement operation after an end of input of movement operation. The "gradual reduction of the behavior speed of the robot" in this context refers to reduction of the speed at a rate substantially equivalent to a reduction rate of the rotation speed from the time of no input of operation to the operation graphic to a rotation stop of the operation graphic on the assumption that the operation graphic is an object having substance whose rotation receives inertial force and friction force, for example. Accordingly, the degree of speed reduction of "gradual speed reduction" is variable in accordance with the behavior speed of the robot immediately before the end of input of the movement operation.

This structure is more suitable for flick operation performed as a type of movement operation. In this structure, the behavior speed of the robot gradually decreases even after an end of input of flick operation. In this case, the robot continues motion for a certain period after the end of input of the flick operation without a sudden stop immediately after the end of input of the flick operation. Accordingly, the user is capable of continuing motion of the robot without completely stopping the robot by repeating quick flick operation, for example. This structure effectively utilizes a limited area on the touch panel. In other words, the area required for movement operation on the touch panel decreases, and therefore size reduction of the robot operation apparatus is achievable. Moreover, the user is capable of reducing a shift amount of the finger or the like at the time of movement operation by performing quick flick operation for motion of the robot, for example. As a result, operability improves with a reduced burden on the user.

When the foregoing speed reduction process is initiated immediately after an end of input of movement operation, the following problems occur in case of input of multiple movement operations. In this situation, the behavior speed of the robot decreases as a result of the speed reduction process performed within a period from the end of input of previous movement operation until subsequent movement operation. In this case, the behavior speed of the robot is easily variable, and therefore motion of the robot easily becomes unstable.

According to the robot operation apparatus of the present disclosure, the behavior speed determination process may include a speed maintenance process. The speed maintenance process is a process for maintaining the behavior speed of the robot at the behavior speed of the robot immediately before the end of input of movement operation for a predetermined period from the end of input of the movement operation until a start of the speed reduction process. In this case, the user inputs subsequent movement operation within a predetermined period of the speed maintenance process to avoid speed reduction resulting from the speed reduction process before input of subsequent movement operation. As a result, variations in the behavior speed of the robot decrease, and therefore stability of the behavior speed of the robot improves, for example, even when the flick operation is performed continuously. Moreover, this structure easily maintains the constant behavior speed of the robot even when the intervals of flick operation are relatively long. Accordingly, the number of times of flick operation decreases, and therefore reduction of a burden on the user is achievable. After completion of the speed maintenance process for the predetermined period, the foregoing speed reduction process is performed. In this case, the behavior speed of the robot decreases to a stop after an elapse of a predetermined period from the time of no input of movement operation. Accordingly, sufficient safety is securable.

According to the robot operation apparatus of the present disclosure, in a state that subsequent movement operation is input during the speed maintenance process based on previous movement operation, the behavior command generator may perform a process which maintains the behavior speed of the robot at the operation speed of the previous movement operation when the operation speed of the subsequent movement operation falls within a predetermined range for the operation speed of the previous movement operation, and determines the behavior speed of the robot based on the operation speed of the subsequent movement operation when the operation speed of the subsequent movement operation lies out of the predetermined range for the operation speed of the previous movement operation.

For continuously operating the robot at a constant speed, the user is required to input flick operation multiple times. In this case, the operation speed of each flick operation may become variable and therefore is difficult to keep constant. When the behavior speed of the robot is determined based on the operation speed for each flick operation, the behavior speed of the robot is affected by variations of the operation speed of each flick operation, and thus the operation speed fluctuates and tends to be unstable.

In this structure, the behavior command generator maintains the behavior speed of the robot determined based on the previous movement operation when the operation speed of the subsequent movement operation falls within the predetermined range. In this case, the constant behavior speed of the robot is maintained even in a state of certain variations of the operation speed of each flick operation when the operation speed of each flick operation falls within the predetermined range. This structure therefore absorbs variations of the operation speed of each movement operation, thereby improving stability of the motion of the robot. Moreover, the user is capable of changing the behavior speed of the robot by inputting movement operation having the operation speed out of the predetermined range, for example. This structure therefore allows flexible operation while absorbing variations of the operation speed of movement operation. As a result, operability improves.

According to the robot operation apparatus of the present disclosure, the behavior command generator may perform a stop process. The stop process is a process for stopping the robot when touch operation is performed to the operation graphic for a predetermined period or longer during motion of the robot. In this structure, the user is capable of stopping motion of the robot without the necessity of waiting for a stop as a result of the speed reduction process when the user performs touch operation to the operation graphic for a predetermined period or longer even during motion of the robot in the speed reduction process or the speed maintenance process. Accordingly, the user is capable of stopping motion of the robot at arbitrary timing. As a result, safety and operability further improve.

According to the robot operation apparatus of the present disclosure, the behavior command generator may perform a correction process. The correction process is a process for shifting the robot to the position at which touch operation is performed for the stop process, when the robot shifts from the position at which the touch operation is performed. A certain time is required from input of touch operation by the user to stop the motion of the robot until an actual stop of the robot. In this case, the robot may shift to a position exceeding the stop position intended by the user. In other words, the actual stop position of the robot deviates from the robot stop position intended by the user. In this structure, the correction process allows the robot to return to the position at which the touch operation is performed, even when the robot shifts from the position at which the touch operation is performed. Accordingly, deviation between the robot stop position intended by the user and the actual stop position of the robot is correctable. As a result, operability further improves.

The robot operation program product according to the present disclosure realizes the robot operation program. Robot operation programs included in the robot operation program product may be executed by a general-purpose tablet-type PC, a smartphone or the like provided with a touch panel display, for example. In this case, the general-purpose tablet-type PC, the smartphone or the like obtains a function equivalent to the robot operation apparatus described above.

It is noted that a flowchart or the processing of the flowchart in the present application includes multiple steps (also referred to as sections), each of which is represented, for instance, as S11. Further, each step can be divided into several sub-steps while several steps can be combined into a single step.

The present disclosure may be realized as a robot operation apparatus and a program product realizing the robot operation apparatus, and, in addition, may be realized as a non-transitory computer readable storage medium storing the program product.

While the embodiments, the configurations, and the modes of a robot operation apparatus and a robot operation program product according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A robot operation apparatus comprising:
   a touch panel that receives input of a touch operation and a movement operation from a user;
   an operation detector that detects the touch operation and the movement operation to the touch panel; and
   a behavior command generator that generates a behavior command operating a robot based on a detection result of the operation detector,
   wherein:
   the behavior command generator calculates, as a behavior speed determination process, an operation speed of the movement operation when the operation detector detects the movement operation to an operation graphic drawn on the touch panel, and
   the behavior command generation further determines, as the behavior speed determination process, a behavior speed of the robot based on the operation speed calculated of the movement operation.

2. The robot operation apparatus according to claim 1, wherein:
   the behavior command generator
      determines a behavior direction of the robot to a positive direction when an operation direction of the movement operation is a positive direction with respect to a rotation circumferential direction of the operation graphic, and
      determines the behavior direction of the robot to a negative direction when the operation direction of the movement operation is a negative direction with respect to the rotation circumferential direction of the operation graphic.

3. The robot operation apparatus according to claim 1, wherein:
   the operation graphic includes a plurality of selection areas to which behavior modes of the robot provided by driving axes or combinations of the driving axes of the robot are allocated; and
   the behavior command generator determines a behavior mode to which a selection area receiving the touch operation is allocated to a behavior mode of the robot when the operation detector detects the touch operation with respect to the selection area.

4. The robot operation apparatus according to claim 1, further comprising:
   a display that displays a graphic; and
   a display controller that controls display contents of the display,
   wherein:
   the display controller performs an operation graphic display process that displays the operation graphic on the display.

5. The robot operation apparatus according to claim 4, wherein:
   the operation graphic display process includes displaying the operation graphic on the display by rotating the operation graphic in accordance with a movement of a present position by the movement operation.

6. The robot operation apparatus according to claim 1, wherein:
the behavior speed determination process determines the behavior speed of the robot based on an angular speed of the movement operation around a rotation center provided on the operation graphic.

7. The robot operation apparatus according to claim 6, wherein:
the behavior speed determination process includes determination that the movement operation within an invalid area is invalid when the operation detector detects the movement operation to the invalid area provided in a vicinity of the rotation center on the operation graphic.

8. The robot operation apparatus according to claim 1, wherein:
the behavior speed determination process determines the behavior speed of the robot based on a circumferential speed of the movement operation with respect to a rotation center provided on the operation graphic.

9. The robot operation apparatus according to claim 1, wherein:
the behavior speed determination process includes a speed reduction process that gradually decreases the behavior speed of the robot in a period when a subsequent movement operation is not received after input of the movement operation has ended.

10. The robot operation apparatus according to claim 9, wherein:
the behavior speed determination process further includes a speed maintenance process that maintains the behavior speed of the robot immediately before the input of the movement operation ends in a predetermined period after the input of the movement operation has ended and before the speed reduction process starts.

11. The robot operation apparatus according to claim 10, wherein:
in a case where the subsequent movement operation is input during the speed maintenance process based on a previous movement operation,
the behavior command generator
maintains the behavior speed of the robot at the operation speed of the previous movement operation when the operation speed of the subsequent movement operation falls within a predetermined range for the operation speed of the previous movement operation, and
determines the behavior speed of the robot based on the operation speed of the subsequent movement operation when the operation speed of the subsequent movement operation falls out of the predetermined range for the operation speed of the previous movement operation.

12. The robot operation apparatus according to claim 9, wherein:
the behavior command generator performs a stop process that stops the robot when the touch operation has been performed to the operation graphic for a predetermined period or longer during motion of the robot.

13. The robot operation apparatus according to claim 12, wherein:
the behavior command generator performs correction that shifts the robot to a position of the robot at which the touch operation is performed, when the robot shifts from the position at which the touch operation for execution of the stop process is performed.

14. A robot operation program product that is stored in a non-transitory computer readable storage medium and includes a command that causes a computer to:
calculate an operation speed of a movement operation when an operation detector detects the movement operation to an operation graphic drawn on the touch panel; and
determine a behavior speed of a robot based on the operation speed calculated of the movement operation,
wherein the computer is embedded in a robot operation apparatus, the robot operation apparatus including:
a touch panel that receives input of a touch operation and the movement operation from a user,
the operation detector that detects the touch operation and the movement operation to the touch panel, and
a behavior command generator that generates a behavior command operating a robot based on a detection result by the operation detector.

15. A robot operation apparatus comprising:
a touch panel that receives input of a touch operation and a movement operation from a user;
an operation detector that detects the touch operation and the movement operation to the touch panel; and
a behavior command generator that generates a behavior command operating a robot based on a detection result of the operation detector,
wherein:
the behavior command generator performs a behavior speed determination process that determines a behavior speed of the robot based on an operation speed of the movement operation, when the operation detector detects the movement operation to an operation graphic drawn on the touch panel;
the operation graphic has a predetermined shape and has a rotation center so as to be operated in a rotation circumferential direction around the rotation center; and
the behavior command generator determines a behavior direction of the robot to a predetermined direction when the operation graphic is operated around the rotation center in a predetermined direction of the rotation circumferential direction.

* * * * *